United States Patent
Judd et al.

(10) Patent No.: US 10,699,742 B2
(45) Date of Patent: *Jun. 30, 2020

(54) BEHAVIORAL MODEL FOR DYNAMIC TENSION COMPENSATION

(71) Applicant: International Business Machines Corporation, Armonk, NY (US)

(72) Inventors: Kevin B. Judd, Tucson, AZ (US); Ernest S. Gale, Tucson, AZ (US); Randy C. Inch, Tucson, AZ (US); Eiji Ogura, Yokohama (JP); Kazuhiro Tsuruta, Tokyo (JP); Pamela R. Nylander-Hill, Tucson, AZ (US); Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,259

(22) Filed: Feb. 5, 2019

(65) Prior Publication Data

US 2019/0325910 A1    Oct. 24, 2019

Related U.S. Application Data

(63) Continuation of application No. 15/961,682, filed on Apr. 24, 2018, now Pat. No. 10,276,204.

(51) Int. Cl.
*G11B 15/093* (2006.01)
*G11B 15/43* (2006.01)
*G11B 5/55* (2006.01)

(52) U.S. Cl.
CPC ............ *G11B 15/43* (2013.01); *G11B 5/5539* (2013.01)

(58) Field of Classification Search
CPC ....... G11B 15/43; G11B 5/5539; G11B 27/36; G11B 20/18; G11B 5/52; G11B 15/093; G11B 5/584; G11B 5/5513; G11B 5/55
(Continued)

(56) References Cited

U.S. PATENT DOCUMENTS 8,780,682 B2    7/2014 Madison et al.
8,793,552 B2    7/2014 Katagiri et al.
(Continued)

OTHER PUBLICATIONS

List of IBM Patents or Patent Applications Treated as Related.
(Continued)

*Primary Examiner* — Nabil Z Hindi
(74) *Attorney, Agent, or Firm* — Zilka-Kotab, P.C.

(57) ABSTRACT

A tape drive-implemented method, according to one embodiment, includes: detecting a read error, and sending one or more instructions to perform a first re-read attempt on a portion of a magnetic tape corresponding to the read error. In response to determining that the first re-read attempt was unsuccessful, a range of tension settings is selected. A range of lateral offsets is also selected. Moreover, one or more instructions are sent to apply each unique combination of a tension setting from the range of tension settings and a lateral offset from the range of lateral offsets. For each of the unique combinations applied, one or more instructions are sent to perform a second phase re-read attempt on the portion of the magnetic tape corresponding to the read error. Furthermore, a determination is made as to whether the second phase re-read attempt was performed successfully for any of the unique combinations.

20 Claims, 17 Drawing Sheets

(58) Field of Classification Search
USPC ..... 360/31, 53, 70, 72.3, 73.04, 73.12, 74.3, 360/78.02
See application file for complete search history.

(56) References Cited

U.S. PATENT DOCUMENTS

| | | |
|---|---|---|
| 8,896,958 B2 | 11/2014 | Fasen et al. |
| 8,941,940 B1 | 1/2015 | Bayang et al. |
| 9,053,748 B2 | 6/2015 | Katagiri et al. |
| 9,177,580 B1 | 11/2015 | Vanderheyden et al. |
| 9,590,660 B2 | 3/2017 | Katagiri et al. |
| 9,621,193 B1 | 4/2017 | Bentley et al. |
| 9,799,371 B1 | 10/2017 | Hirashima et al. |
| 10,276,204 B1 | 4/2019 | Judd et al. |
| 2004/0129818 A1 | 7/2004 | Sugawara et al. |
| 2006/0092547 A1 | 5/2006 | Kawakami et al. |
| 2009/0316296 A1 | 12/2009 | Cherubini et al. |
| 2013/0188271 A1 | 7/2013 | Fasen et al. |
| 2014/0139944 A1 | 5/2014 | Johnson et al. |
| 2014/0189460 A1 | 7/2014 | Katagiri et al. |

OTHER PUBLICATIONS

Lantz et al., "Future Scaling Potential of Particulate Media in Magnetic Tape Recording," Handbook of Magnetic Materials, vol. 22, Chapter Three, 2014, pp. 317-379.
U.S. Appl. No. 15/437,561, filed Feb. 21, 2017.
Judd et al., U.S. Appl. No. 15/961,682, filed Apr. 24, 2018.
Notice of Allowance from U.S. Appl. No. 15/961,682, dated Dec. 18, 2018.
International Search Report and Written Opinion from PCT Application No. PCT/EP2019/060045, dated Jun. 28, 2019.
Young et al., "Lateral and Longitudinal Dynamic Behavior and Control of Moving Webs," Journal of Dynamic Systems, Measurement, and Control, vol. 115, Jun. 1993, pp. 309-317.

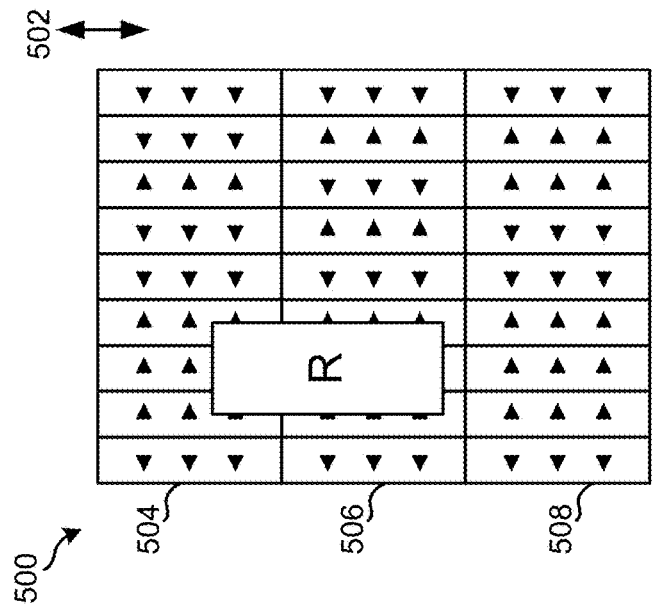
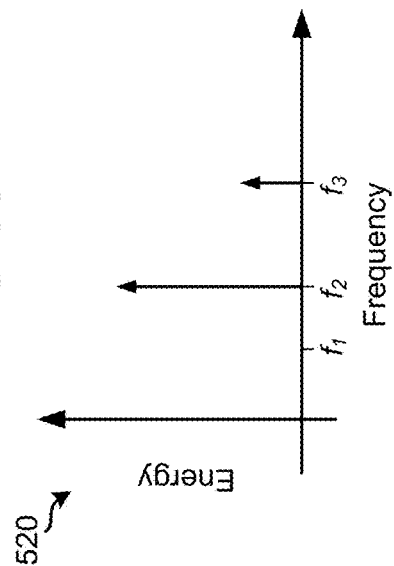
FIG. 5C
FIG. 5D
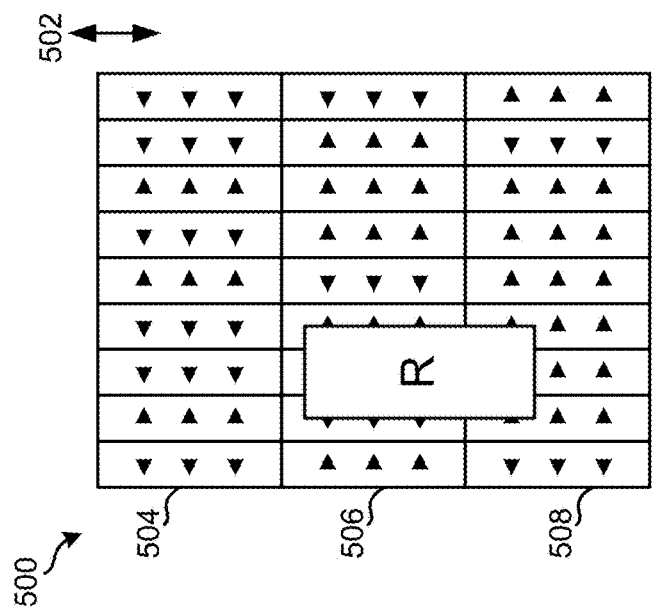
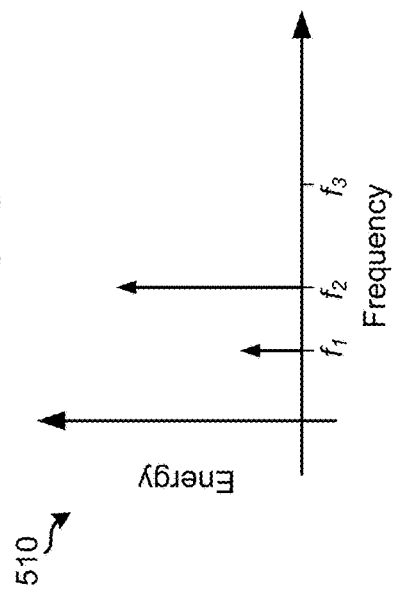
FIG. 5A
FIG. 5B er to read the patterns as they are passed over the servo reader.
BEHAVIORAL MODEL FOR DYNAMIC TENSION COMPENSATION

BACKGROUND

The present invention relates to tape storage systems, and more specifically, to selectively adjusting tape drive settings to successfully read data from magnetic tape.

Timing-based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader.

In a TBS format, the servo pattern is prerecorded in several bands distributed across the tape. Typically, five or nine servo pattern bands are included on a given tape which runs about parallel to a longitudinal axis of the tape. Data is recorded in the regions of tape located between pairs of the servo bands. In read/write heads of IBM linear tape-open (LTO) and Enterprise tape drives, two servo readers are normally available per head module, from which longitudinal position (LPOS) information as well as a position error signal (PES) may be derived. Effective detection of the TBS patterns is achieved by a synchronous servo channel employing a matched-filter interpolator/correlator, which ensures desirable filtering of the servo reader signal.

With the increase in track density that is envisioned for future tape media and tape drives, accurately controlling the lateral position of the head and/or skew of the head with respect to tape by using feedback generated by reading the TBS patterns becomes increasingly difficult. Conventional servo based implementations may not be sufficiently accurate to ensure adequate positioning of the data readers and writers that move along data tracks. Furthermore, the repetition rate of the head lateral position estimates may be too low to ensure proper track-following operation as tape velocity varies during use. The repetition rate of the head lateral position estimates may additionally be unable to support future actuators with larger bandwidths.

SUMMARY

A tape drive-implemented method, according to one embodiment, includes: detecting a read error, and determining whether the read error is part of an error burst. In response to determining that the read error is not part of an error burst, one or more instructions are sent to perform a first re-read attempt on a portion of a magnetic tape corresponding to the read error. A determination is made as to whether the first re-read attempt was performed successfully. In response to determining that the first re-read attempt was not performed successfully, a range of tension settings is selected. A range of lateral offsets is also selected. Moreover, one or more instructions are sent to apply each unique combination of a tension setting from the range of tension settings and a lateral offset from the range of lateral offsets. For each of the unique combinations applied, one or more instructions are sent to perform a second phase re-read attempt on the portion of the magnetic tape corresponding to the read error. Furthermore, a determination is made as to whether the second phase re-read attempt was performed successfully for any of the unique combinations.

A computer program product, according to another embodiment, includes a computer readable storage medium having program instructions embodied therewith. The program instructions are readable and/or executable by a processor to cause the processor to perform the foregoing method.

A tape drive-implemented method, according to yet another embodiment, includes: detecting a read error, and determining whether the read error is part of an error burst. In response to determining that the error is not part of an error burst on the magnetic tape, one or more instructions are sent to perform a first re-read attempt on a portion of a magnetic tape corresponding to the read error. A determination is made as to whether the first re-read attempt was performed successfully, and a range of tension settings is selected from a tension table in response to determining that the first re-read attempt was not performed successfully. A range of position error signal (PES) lateral offsets are also selected from PES table which includes multiple ranges of PES lateral offset settings. One or more instructions are sent to apply each PES lateral offset in the selected range of PES lateral offsets with each tension setting in the selected range of tension settings. One or more instructions are also sent to perform an additional re-read attempt for each unique combination of a PES lateral offset and a tension setting applied. Further still, a determination is made as to whether any of the additional re-read attempts were performed successfully.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5A is a HD pattern, according to one embodiment.

FIG. 5B is a graph plotting readback energy vs. frequency for the reader in FIG. 5A.

FIG. 5C is a HD pattern, according to one embodiment.

FIG. 5D is a graph plotting readback energy vs. frequency for the reader in FIG. 5C.

DETAILED DESCRIPTION

Figure 1:
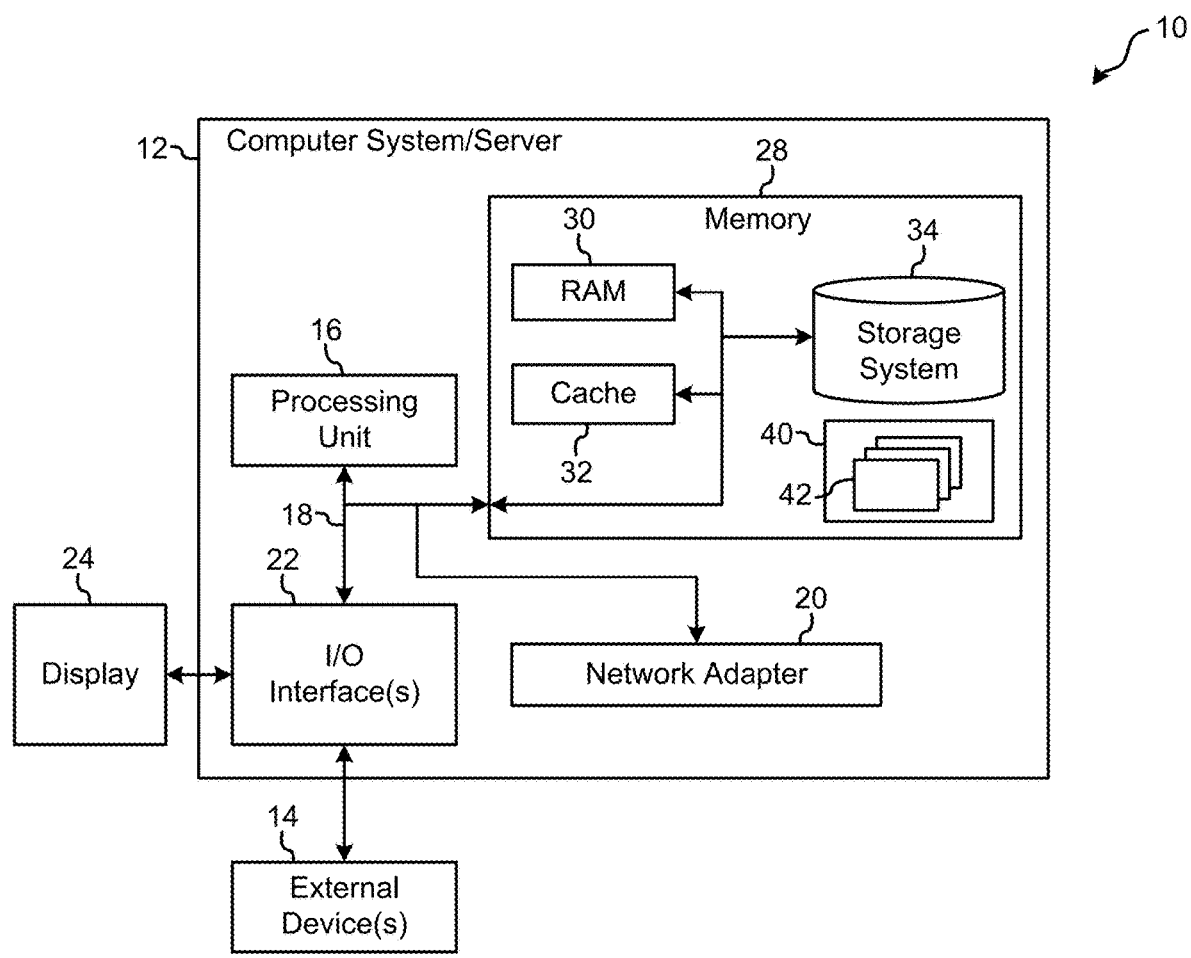
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for improving tape drive performance, e.g., as will be described in further detail below.

In one general embodiment, a tape drive-implemented method includes: initiating performance of a read request on a magnetic tape, detecting a read error, examining performance data corresponding to portions of the read request which have been performed, determining whether a current tension setting of the magnetic tape is accurate, determining whether the read error is part of an error burst in response to determining that the current tension setting of the magnetic tape is accurate, sending one or more instructions to perform a first re-read attempt on a portion of the magnetic tape corresponding to the read error in response to determining that the read error is not part of an error burst, determining whether the first re-read attempt was performed successfully, selecting a range of tension settings in response to determining that the first re-read attempt was not performed successfully, selecting a range of lateral offsets, sending one or more instructions to apply each unique combination of a tension setting from the range of tension settings and a lateral offset from the range of lateral offsets, for each of the unique combinations applied, sending one or more instructions to perform a second phase re-read attempt on the portion of the magnetic tape corresponding to the read error, and determining whether the second phase re-read attempt was performed successfully for any of the unique combinations.

In another general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: initiating, by the processor, performance of a read request on a magnetic tape; detecting, by the processor, a read error; examining, by the processor, performance data corresponding to portions of the read request which have been performed; determining, by the processor, whether a current tension setting of the magnetic tape is accurate; determining, by the processor, whether the read error is part of an error burst in response to determining that the current tension setting of the magnetic tape is accurate; sending, by the processor, one or more instructions to perform a first re-read attempt on a portion of the magnetic tape corresponding to the read error in response to determining that the read error is not part of an error burst; determining, by the processor, whether the first re-read attempt was performed successfully; selecting, by the processor, a range of tension settings in response to determining that the first re-read attempt was not performed successfully; selecting, by the processor, a range of lateral offsets; sending, by the processor, one or more instructions to apply each unique combination of a tension setting from the range of tension settings and a lateral offset from the range of lateral offsets; for each of the unique combinations applied, sending, by the processor, one or more instructions to perform a second phase re-read attempt on the portion of the magnetic tape corresponding to the read error; and determining, by the processor, whether the second phase re-read attempt was performed successfully for any of the unique combinations.

In yet another general embodiment, a system includes: a processor; and logic integrated with and/or executable by the processor, the logic being configured to cause the processor to: initiate, by the processor, performance of a read request on a magnetic tape; detect, by the processor, a read error; examine, by the processor, performance data corresponding to portions of the read request which have been performed; determine, by the processor, whether a current tension setting of the magnetic tape is accurate; determine, by the processor, whether the read error is part of an error burst in response to determining that the current tension setting of the magnetic tape is accurate; send, by the processor, one or more instructions to perform a first re-read attempt on a portion of the magnetic tape corresponding to the read error in response to determining that the read error is not part of an error burst; determine, by the processor, whether the first re-read attempt was performed successfully; select, by the processor, a range of tension settings in response to determining that the first re-read attempt was not performed successfully; select, by the processor, a range of lateral offsets; send, by the processor, one or more instructions to apply each unique combination of a tension setting from the range of tension settings and a lateral offset from the range of lateral offsets; for each of the unique combinations applied, send, by the processor, one or more instructions to perform a second phase re-read attempt on the portion of the magnetic tape corresponding to the read error; and determine, by the processor, whether the second phase re-read attempt was performed successfully for any of the unique combinations.

In another general embodiment, a tape drive-implemented method includes: sending one or more instructions to initiate performance of a read request on a magnetic tape, detecting a read error, examining performance data corresponding to portions of the read request which have been performed, determining whether a current tension setting of the magnetic tape is accurate, sending one or more instructions to remove the current tension setting in response to determining that the current tension setting of the magnetic tape is not accurate, determining whether the read error is part of an error burst, and using historical data and read correction data to determine whether to adjust the current tension setting in response to determining that the read error is part of an error burst. Using the historical data and the read correction data includes: counting a number of channels that are unreadable, and assessing whether the unreadable channels have an overall channel degradation pattern which affects channels which are located closer to an edge of the magnetic tape more than channels which are located closer to a longitudinal axis of the magnetic tape. Furthermore, tape drive-implemented method includes: sending one or more instructions to perform a first re-read attempt on a portion of the magnetic tape corresponding to the read error in response to determining that the error is not part of an error burst on the magnetic tape, determining whether the first re-read attempt was performed successfully, selecting a range of tension settings from a tension table in response to determining that the first re-read attempt was not performed successfully, selecting a range of position error signal (PES) lateral offsets from PES table, sending one or more instructions to apply each PES lateral offset in the selected range of PES lateral offsets with each tension setting in the selected range of tension settings, sending one or more instructions to perform an additional re-read attempt for each unique combination of a PES lateral offset and a tension setting applied, determining whether any of the additional re-read attempts were performed successfully, sending one or more instructions to apply one or more calibration changes in response to determining that none of the additional re-read attempts were performed successfully, sending one or more instructions to apply dataset reconstruction and iterative decode operations, sending one or more instructions to perform a third phase re-read attempt, determining whether the third phase re-read attempt was performed successfully, and concluding that a permanent error exists on the magnetic tape in response to determining that the third re-read attempt was not performed successfully. The tension table includes multiple ranges of tension settings. Moreover, each range of tension settings includes a sequence of tension settings that incorporates a nominal tension setting. The PES table also includes multiple ranges of PES lateral offset settings.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processor 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disc drive for reading from or writing to a removable, non-volatile optical disc such as a compact disc read-only memory (CD-ROM), digital versatile disc-read only memory (DVD-ROM) or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2:
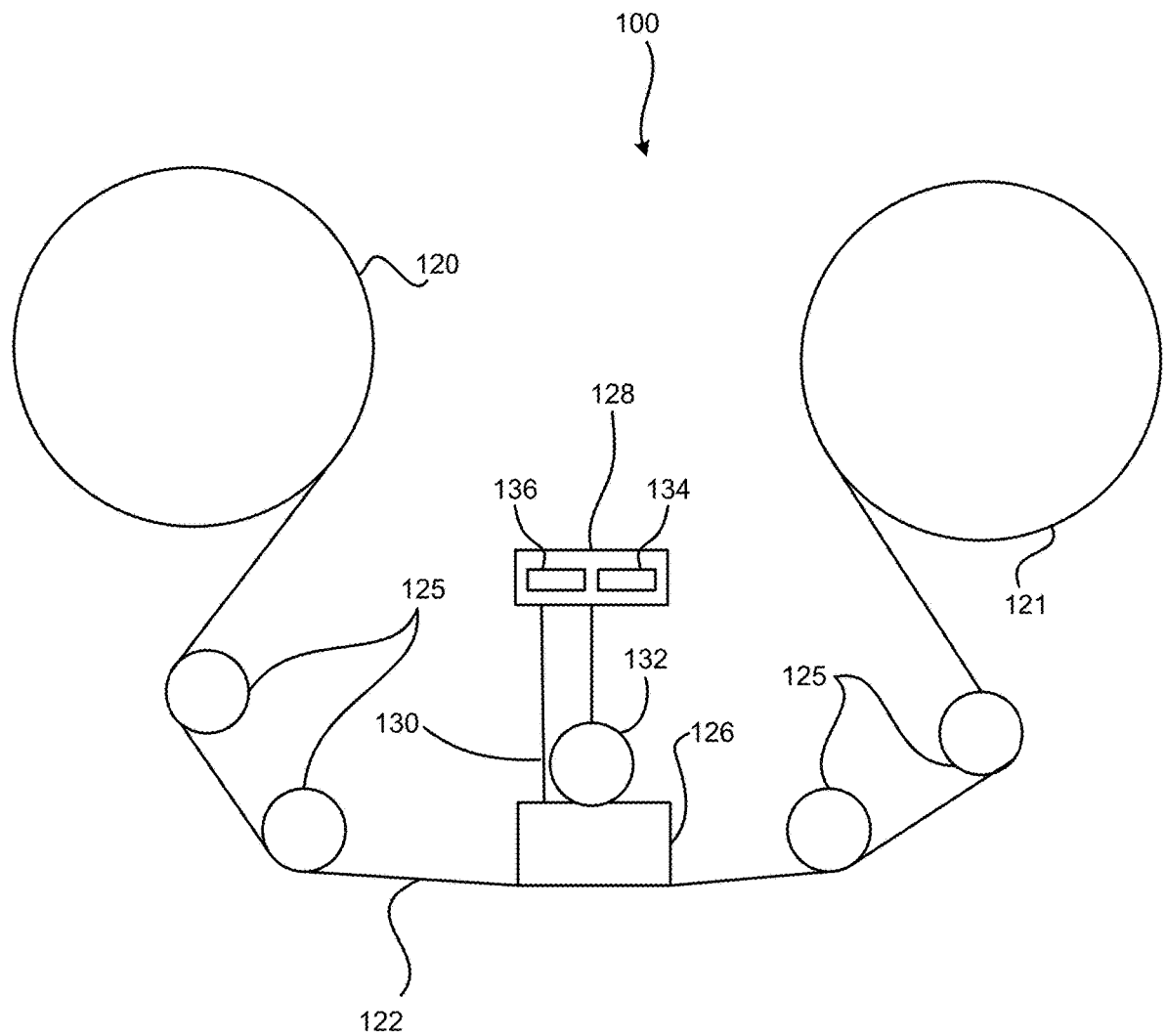
FIG. 2 illustrates a simplified tape drive of a tape-based data storage system, according to one embodiment.

Looking to FIG. 2, a tape supply cartridge 120 and a take-up reel 121 are provided to support a tape 122. One or more of the reels may form part of a removable cartridge and are not necessarily part of the tape drive 100. A tape drive, e.g., such as that illustrated in FIG. 2, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
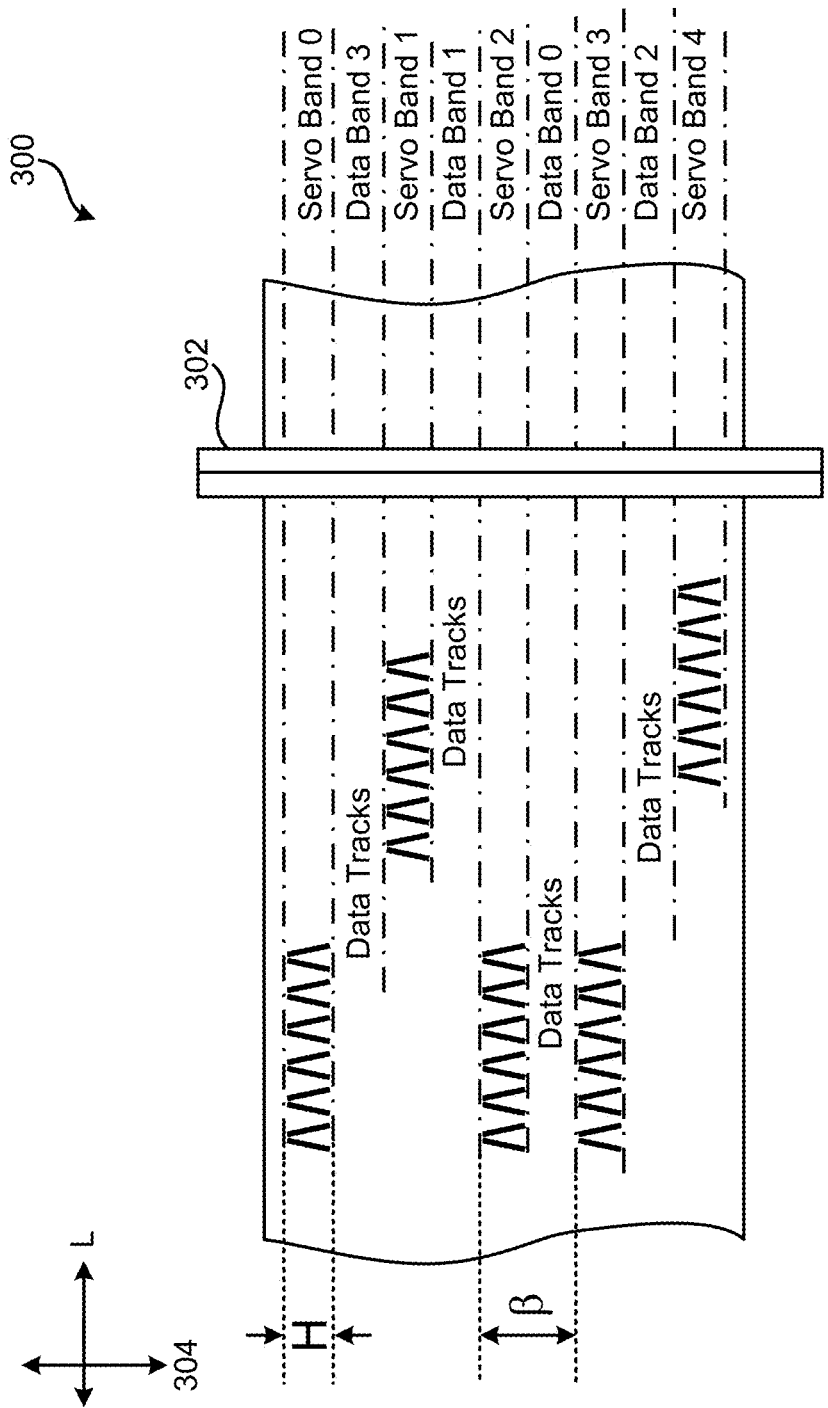
FIG. 3 illustrates a tape layout, according to one embodiment.

Referring momentarily to FIG. 3, an illustrative tape layout is depicted in accordance with one embodiment. As shown, tape 300 has a tape layout which implements five servo bands Servo Band 0-Servo Band 4, and four data bands Data Band 0-Data Band 3, as specified in the LTO format and IBM Enterprise format. The height H of each of the servo bands is measured in the cross-track direction 304 which is about orthogonal to the length L of the tape 300.

According to an example, the height H of each of the servo bands may be about 186 microns according to the LTO format. Moreover, a pitch 13 between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives may be configured to operate at low tape velocities and/or with nanometer head position settings. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

However, according to some embodiments, magnetic tape may further be augmented with additional features that provide additional functionality. Accordingly, HD servo patterns may be implemented in place of the standard TBS servo patterns, e.g., as seen in FIG. 3. The HD servo patterns may be used to improve track-following performance.

In still further embodiments, a standard TBS servo pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

Figure 4A:
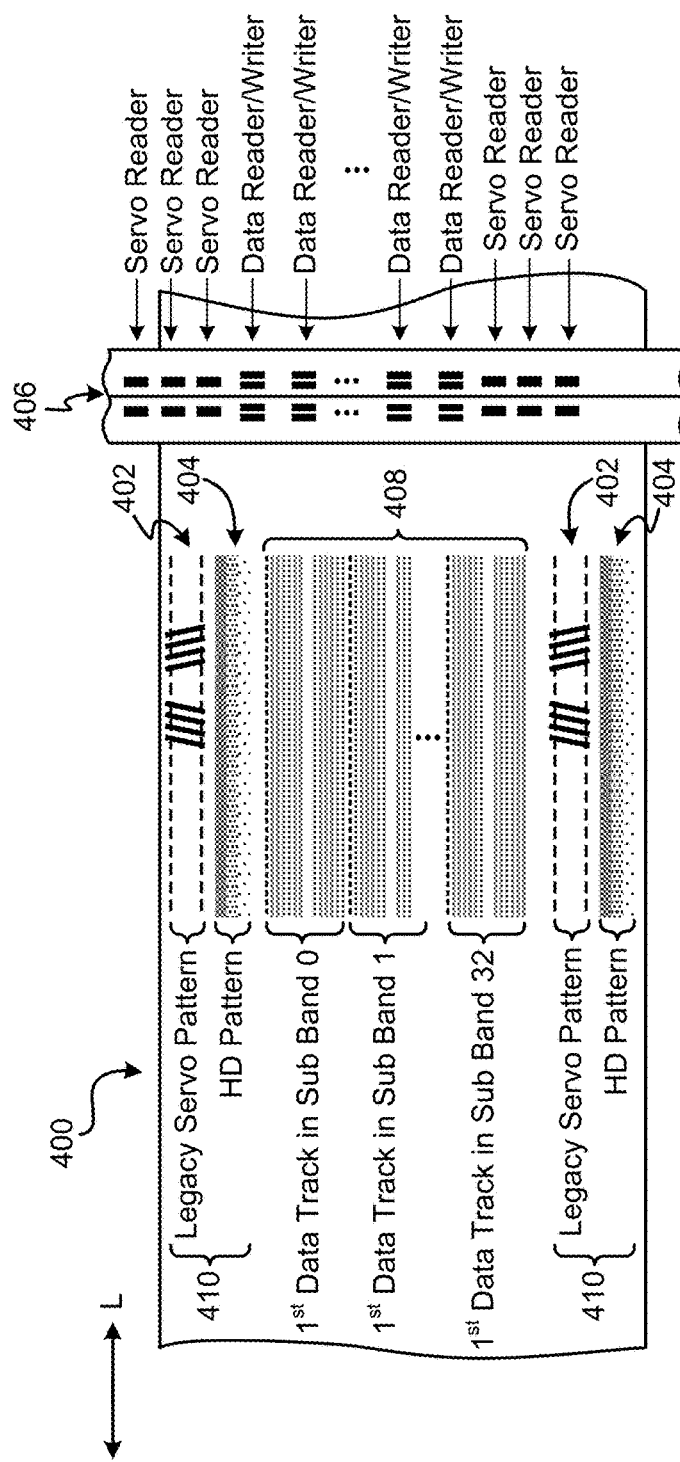
FIG. 4A shows a hybrid servo pattern written in a dedicated area of a tape medium, according to one embodiment.

A hybrid servo pattern 410, which includes a standard TBS pattern 402 written in a servo band, as well as an HD pattern 404 that is written in a HD band (e.g., dedicated area) of the tape medium 408 is shown in FIG. 4A. Moreover, each HD pattern 404 includes a number of HD tracks, each of the HD tracks having a respective periodic waveform, e.g., as seen in FIGS. 5A, 5C. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, longitudinal position (LPOS), etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

Samples provided at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in some embodiments, as will be described in further detail below.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT. Furthermore, the integration interval may be freely adjusted, while a DFT/FFT-based solution involves the integration interval being multiples of the DFT/FFT size.

Even when the HD servo pattern uses a large number of tone frequencies, the maximum number of spectral estimates that are computed by the proposed detector may correspond to the maximum number of tracks that an HD servo reader reads simultaneously at any time. Also, the proposed detector may be reconfigured to provide spectral estimates corresponding to the tracks currently being read based on the coarse positioning information from the TBS channel.

Referring again to FIG. 4A, which shows a tape layout 400 with a hybrid servo pattern 410 according to one embodiment, in the hybrid servo pattern 410, an HD pattern 404 is written in a space adjacent to a standard TBS pattern 402. According to the present embodiment, quadrature sequences are not included due to the use of the TBS pattern 402, which is converse to products implementing servo functionality in hard-disk drives.

Figure 4B:
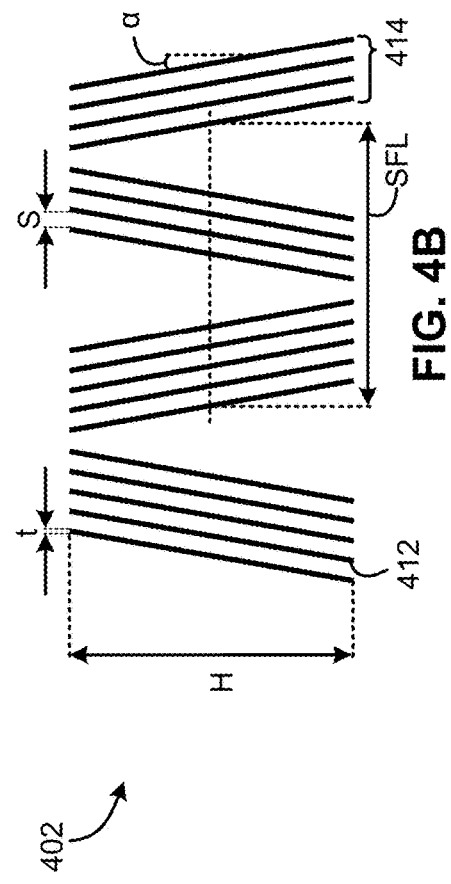
FIG. 4B shows a partial detailed view of a TBS pattern, according to one embodiment.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle $\alpha$. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 µm, and the angle $\alpha$ may be about 6°, while the thickness t is about 2.1 µm. Moreover, the spacing S between each of the servo stripes 412 and/or the sub-frame length SFL between servo bursts 414 having the same azimuthal slope may vary depending on the desired embodiment. According to an exemplary approach, which is in no way intended to limit the invention, the spacing S may be about 5 µm, while the sub-frame length SFL is about 100 µm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

An HD servo pattern preferably includes periodic waveforms of differing frequencies alternately written in the lateral (cross-track) direction. Accordingly, HD servo patterns may be able to desirably provide more accurate and/or more frequent estimates of servo channel parameters according to various embodiments described herein. Looking to FIGS. 5A-5D, an HD pattern 500 is shown that overcomes the limited range of lateral head displacement associated with an HD pattern having only two periodic waveforms, characterized by two different spatial frequencies. As shown in FIGS. 5A and 5C, at least three frequencies are used for the HD pattern 500 in adjacent tracks, which repeat periodically across the band where the HD pattern is written. In the embodiment of FIGS. 5A and 5C, the servo reader (denoted by the block labelled 'R') spans wider in the cross-track direction 502 than a single track, such that at least two tones are detected under any reading conditions at a given time when the servo reader R is overlapped with the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 μm to about 150 μm, such as about 60 μm, about 75 μm, about 100 μm, etc., depending on the approach. Moreover, the symbol length may be in a range from about 0.5 μm to about 3.0 μm, e.g., such as about 1.0 μm, about 1.5 μm, about 2.0 μm, etc.

Hence, with continued reference to FIGS. 5A-5D, an edge of one of the portions of the HD pattern 500 may be distinguished from the edge of another of the portions. Looking specifically to FIG. 5A, an edge of the middle portion 506 may be distinguished from an edge of the bottom portion 508 by evaluating the signals read by the servo reader R, which overlaps both portions 506, 508. The graph 510 in FIG. 5B identifies the various frequencies in the readback signal from servo reader R and the energy level corresponding to each of the respective frequencies for the position of the servo reader R shown in FIG. 5A. Energy values may be determined in some approaches by integrating over a given amount of time (or distance along the tape). As shown in graph 510, in addition to the middle frequency $f_2$, the bottom frequency $f_1$ is present in the readback signal of the servo reader R and may thereby be detected by a spectral analysis. Furthermore, the energy values of the spectral components $f_1$ and $f_2$ represent the relation of the servo reader R overlapping the middle and bottom portions 506, 508. Given that the energy value of the spectral component of frequency $f_1$ is smaller than the energy value of the spectral component of the second frequency $f_2$, it follows that the servo reader R can be determined to be overlapped with the middle portion 506 more than it is overlapped with the bottom portion 508. Moreover, a comparison of the corresponding energies may be used to determine a fine position of the servo reader R with respect to a magnetic tape.

Similarly, the graph 520 in FIG. 5D identifies the frequencies in the readback signal from servo reader R positioned as shown in FIG. 5C, as well as the energy level corresponding to each of the respective frequencies. As shown, frequencies $f_2$, and $f_3$ are present in the readback signal of the servo reader R, and may be detected by a spectral analysis. Again, the energies of the spectral components for frequencies $f_2$, and $f_3$ indicate that the servo reader R is positioned above the upper and middle portions 504, 506. Given that the energy of the spectral component of frequency $f_3$ is smaller than the energy of the spectral component of frequency $f_2$, it follows that the servo reader R is overlapped with the middle portion 506 more than it is overlapped with the upper portion 504. Moreover, a comparison of the corresponding energy values may be used to determine a fine position of the servo reader R with respect to a magnetic tape.

Note that the waveform periods of the three frequencies may be integer multiples of a period T, for example T=241.3 nm, which corresponds to the highest spatial frequency, which is proportional to 1/T, when spectral estimation by a DFT/FFT-based detector with a minimum number of spectral bins for given integration interval is adopted.

Figure 6:
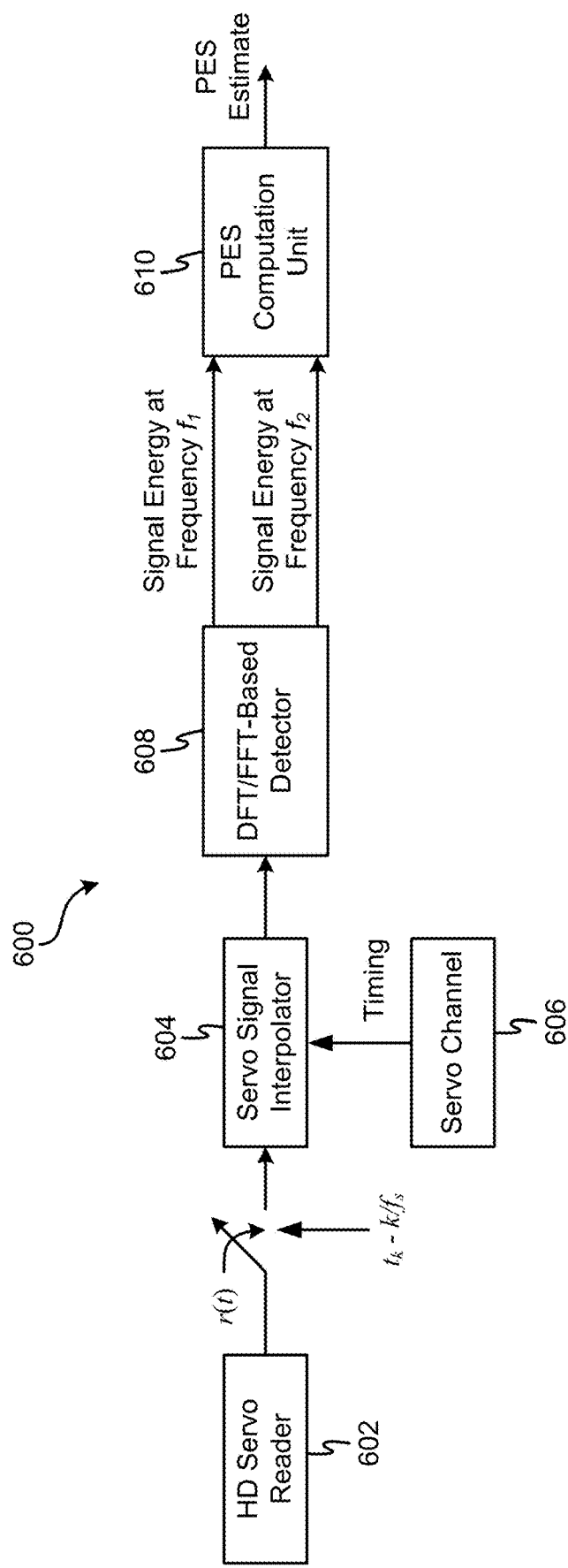
FIG. 6 shows a block diagram of a detector for HD patterns, according to the prior art.

FIG. 6 shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 7:
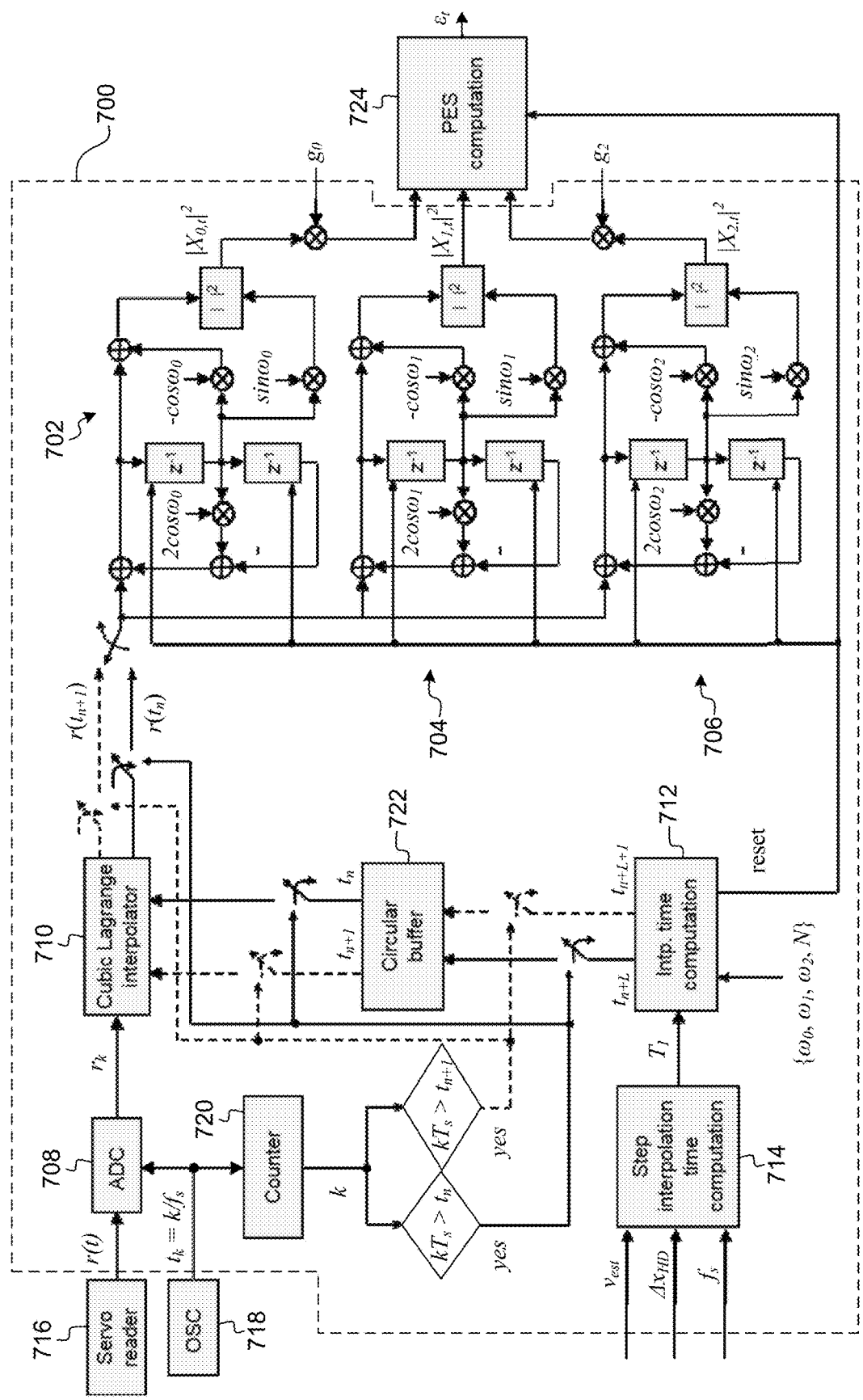
FIG. 7 shows a block diagram of a detector for HD patterns, according to one embodiment.

Now referring to FIG. 7, a detector 700 for HD patterns is shown according to one embodiment. The detector 700 is configured to operate with periodic waveforms, which correspond to the components of the readback signal of an HD pattern, that are characterized by three frequencies at any time, as illustrated for example in FIGS. 5A-5B according to one embodiment. With continued reference to FIG. 7, the detector 700 includes three digital filters 702, 704, 706 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 702, 704, 706 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 702, 704, 706, denoted by $\omega_0/2\pi$, $\omega_1/2\pi$, and $\omega_2/2\pi$, respectively. When a match is not possible, it is preferred that the frequencies are within about 0.001% to 1.0% of the frequencies set for the three digital filters 702, 704, 706, and more preferably a difference of less than about 0.1%. This may be achieved by resampling the output sequence of the analog-to-digital converter (ADC) 708 at appropriate time instants, which may be provided by an interpolator 710, with a time base obtained from the tape velocity and a given interpolation distance $\Delta x_{HD}$, as shown in FIG. 7. The frequency $f_s$ of the clock 718, is used as an input to the ADC 708, the counter 720, and the digital circuitry of the detector 700. Moreover, the frequency $f_s$ of the clock 718 may be either a fixed frequency or a variable frequency.

In one embodiment, the interpolator 710 may be a cubic Lagrange interpolator to achieve smaller signal distortion than a linear interpolator. Of course, any suitable interpolator may be used, as would be understood by one of skill in the art. The output signal samples of the interpolator 710 are obtained that correspond with HD servo signal samples taken at points on the tape that are separated by a step interpolation distance equal to Axe, independently of the tape velocity. Axe is preferably selected such that the condition $T/\Delta x_{HD}=K$ is satisfied independently of the tape velocity, where K is a positive integer number. The time base for the generation of the interpolator output samples may be provided by an interpolation time computation unit 712, which yields the sequence of time instants $\{t_n\}$, at which the resampling of the ADC output sequence takes place. Time instants $\{t_n\}$ may furthermore be provided to circular buffer 722.

The detector 700 illustrated in FIG. 7 may be configured such that a given number of samples is computed by the interpolator 710 within a clock interval $T_s=1/f_s$. However, doing so may set a limit on the maximum tape velocity at which the detector 700 may operate, the maximum tape velocity represented by $2\Delta x_{HD}/T_s$. The maximum tape velocity supported by the detector 700 may be increased by allowing a larger number of samples to be computed by the interpolator 710 within a single clock interval, but doing so also increases computational complexity.

For a fixed tape velocity, the time instants $\{t_n\}$ may be uniformly spaced by $T_I$ seconds, where $T_I$ denotes the time interval that it takes for the tape to travel over a distance equal to the step interpolation distance $\Delta x_{HD}$. The estimation of the time interval $T_I$ is performed by a step interpolation time computation unit 714, which computes $T_I=\Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_s/T_s$, where $T_s=1/f_s$ denotes the clock interval. The ADC clock frequency, $f_s$, may be a fixed frequency in one approach, or a variable frequency in another approach.

In one embodiment, the HD detector 700 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

In another embodiment, the HD detector 700 may be configured to compute a head lateral position estimate for coarse positioning of the servo reader based on an output of a TBS channel of the tape drive. Also, the HD detector 700 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i=2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 700 receives, as inputs, values of the three characteristic frequencies $\{\omega_0, \omega_1, \omega_2\}$, with $\omega_i=2\pi f_i$ from which the coefficients of the digital filters 702, 704, 706 are obtained. These frequencies may be obtained from the knowledge of the servo reader lateral position provided by the TBS channel in one embodiment, as described above. Assuming the number "Q" represents the number of samples over which the estimates of the energies of the periodic waveforms are computed, Q may determine the length of the integration interval, and therefore may also determine the spatial frequency resolution. Assuming the value of Q is even, Q/2 represents the number of frequencies for which energy estimates would be provided by a DFT/FFT-based HD detector that operates over Q samples. Q may be obtained from the tape drive memory in one embodiment. Moreover, Q is typically about 100 or larger.

Multiplication of the three energy estimates by gain factors $g_i$, for i=0, 1, 2, is provided to compensate for the different attenuations that the readback HD servo signal may experience at different frequencies, where the normalization $g_1=1$ may be assumed. Hence, a lateral position estimate of the HD servo reader 716, and hence a position error signal from the knowledge of the target head position, may be obtained by a linear combination of the three energy estimates. Note that the maximum number of spectral estimates that are computed at any time is determined by the maximum number of tracks that may be read by the HD servo reader 716, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 700 may be derived from knowledge of the lateral position estimate obtained from the TBS channel, as mentioned above.

In another embodiment, the HD detector 700 may be implemented without an interpolator 710, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 716. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_i$ of the excess digital filter such that it measures a spectral component at a frequency that is not used by the HD patterns.

The outputs $|X_{i,t}|^2$ from the three digital filters 702, 704, 706 are provided to a PES computation unit 724, which provides a position error estimate $(\varepsilon_t)$ at given time t.

Other components of the HD detector 700 may operate as would be known to one of skill in the art, and are omitted here for the sake of clarity of the described embodiments.

As previously mentioned, accurately controlling the lateral position of the head and/or skew of the head with respect to tape by using feedback generated by reading servo patterns becomes increasingly difficult as track densities continue to increase. In a typical tape drive, multiple tracks may be written and/or read simultaneously. Moreover, in an attempt to achieve high track density, data tracks may be written as small as possible. Accordingly, is desirable to ensure that tracks are written in a correct (e.g., intended) location. However, conventional servo based implementations are not sufficiently accurate to ensure adequate positioning of the data readers and/or writers that move along data tracks while performing read and/or write operations.

Any mismatch of the desired track writing and/or reading location with the actual track writing and/or reading location is referred to as "track misregistration". One type of track misregistration may occur when media physical dimensions change between the time that data was written to the magnetic tape, and the time that the data is actually read from the magnetic tape. These dimensional variations may result from changes in temperature, changes in humidity, long term creep of the media due to stresses in the tape pack, etc. In other situations, difference in tolerances between write and read head locations may act similar to when the media expands and/or contracts to make the entire magnetic tape wider and/or narrower respectively, thereby serving as another potential cause of the dimensional variations experienced over time.

As alluded to above, changes in the dimensions of a magnetic tape may affect the relative spacing of the data transducers on a magnetic head with respect to the data tracks on the magnetic tape. This issue may be particularly prevalent when attempting to read data from these shifted tracks on the magnetic tape. For instance, dimensional fluctuations experienced by a magnetic tape may result in only some of the 32 data readers on a magnetic head to be centered on the respective data tracks of the magnetic tape. Moreover, if enough of the readers have excessive misregistration, then the data will not be read successfully from the magnetic tape.

Figure 8B:
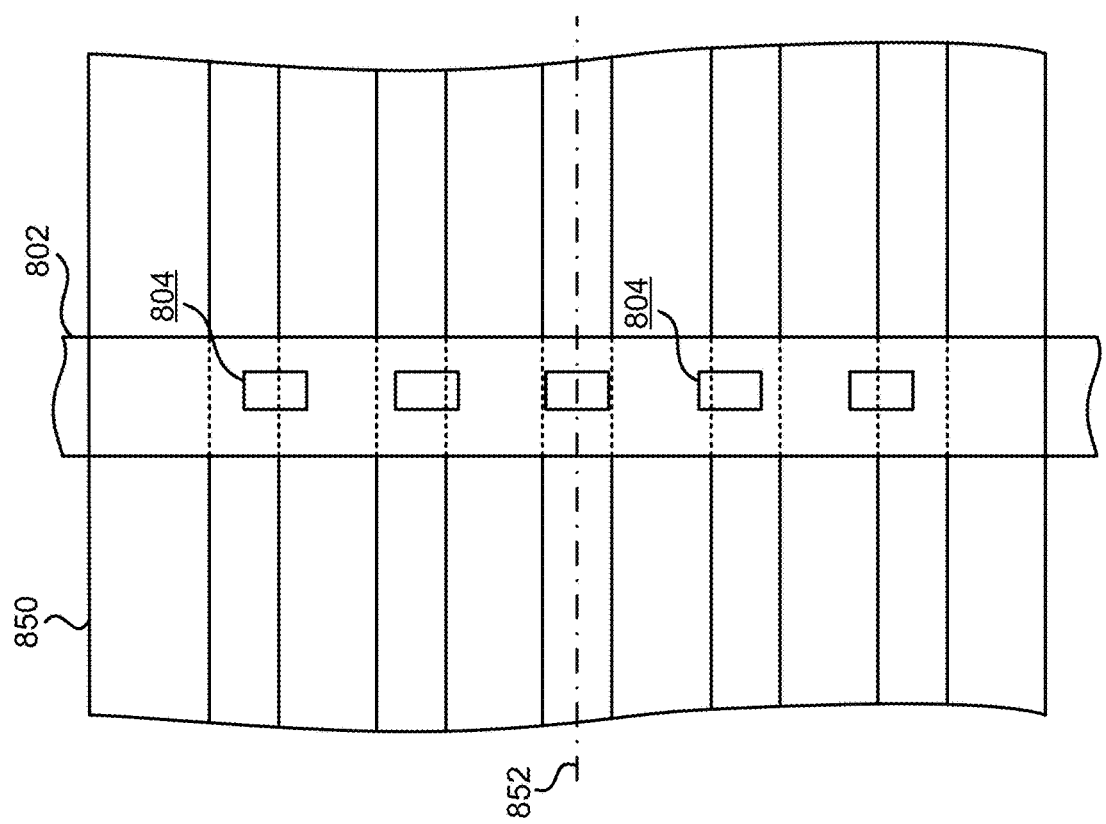
FIG. 8B is a partial representational view of a magnetic head with respect to a magnetic tape, according to one embodiment.
Figure 8A:
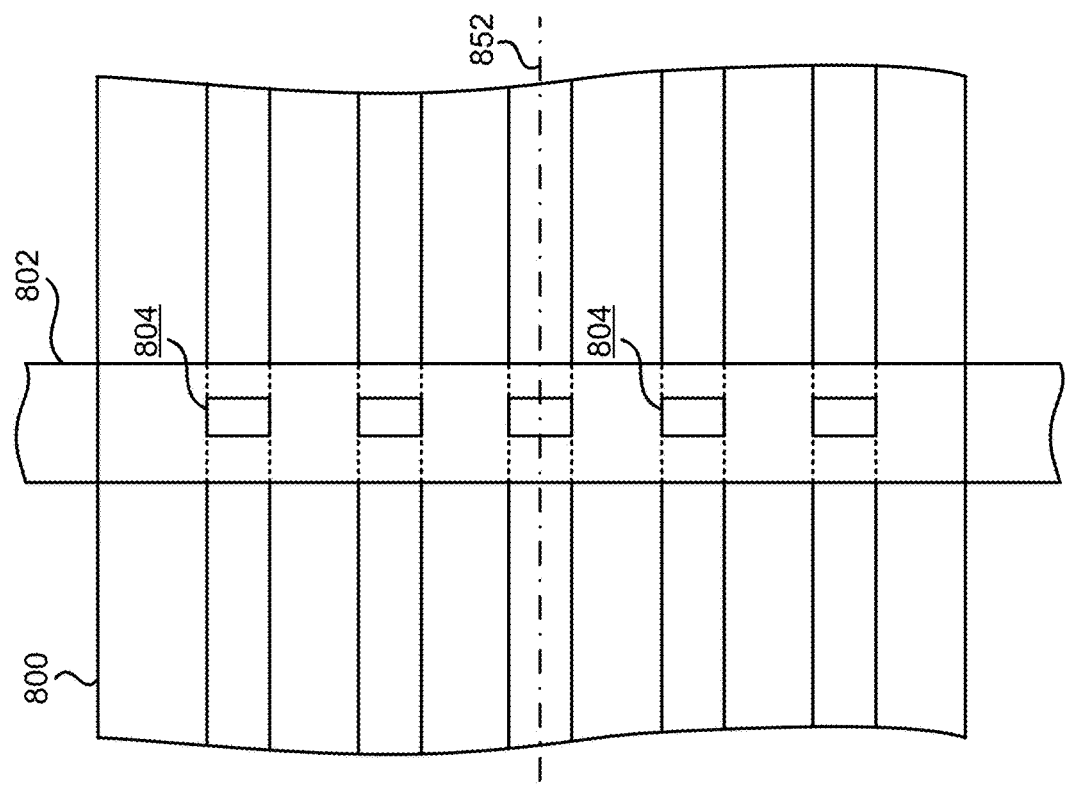
FIG. 8A is a partial representational view of a magnetic head with respect to a magnetic tape, according to one embodiment.

Due to the "accordion-like" manner in which a magnetic tape laterally expands and/or contracts, simply changing the reading position of the magnetic head is not able to align the transducers with the respective data tracks. Referring momentarily to FIGS. 8A-8B, a magnetic head 802 having an array of read transducers 804 is positioned over a magnetic tape 800 having nominal dimensions and a magnetic tape 850 in an expanded state, respectively. As shown in FIG. 8A specifically, each of the read transducers 804 are oriented over a respective data track on the nominal magnetic tape 800. However, looking to FIG. 8B, a number of the read transducers 804 are misaligned with respect to the data tracks on the expanded magnetic tape 850. Again, the "accordion-like" manner in which a magnetic tape expands and/or contracts causes this misalignment to increase in severity the farther the read transducer is from the longitudinal axis 852 of the magnetic tape 850. In other words, the misalignment between the read transducers 804 and the data tracks on the magnetic tape 850 is nonlinear. Accordingly, attempts to shift the lateral position of the magnetic tape will not be able to realign all of the read transducers 804 with the respective data tracks on the magnetic tape 850.

Attempts to overcome this misalignment issue have included reducing the size of the transducers themselves, thereby increasing their ability to remain positioned over the respective data tracks. However, the smaller size of the transducers causes the reader signal output to decrease as well, which is undesirable. Other attempts have applied performance limitations on the magnetic tape itself. These performance limits specify the maximum amount of expansion and/or contraction that the media may undergo in specific environmental conditions. However, as data tracks on the magnetic tape continue to reduce in size, the properties of the materials used to form the tape media are not able to meet these performance limits. Accordingly, conventional products have been unable to maintain adequate tape drive performance.

In sharp contrast, various embodiments included herein introduce a behavioral solution which is able to achieve dynamic tension compensation for magnetic tapes. As mentioned above, the dimensional stability of magnetic tapes is affected by changes in environmental conditions, e.g., such as temperature, humidity, stresses in tape pack during storage, etc.

In some approaches, the appropriate amount of tension to apply to the magnetic tape may be determined by examining previous servo information gathered when the data was written to the magnetic tape and comparing it to current servo information. However, this previous (e.g., historical) servo information may not be available in some approaches. For instance, the previous servo information may have been lost (e.g., overwritten), or may not have been collected in the first place. Accordingly, a behavioral model may be implemented which selectively applies tension to a magnetic tape while reading therefrom in order to compensate for changes in the physical dimensions of the magnetic tape since the data was actually written. Moreover, the behavioral model may be imbedded in microcode error recovery procedures which may be implemented in a variety of different data correction situations. This microcode may also be responsible for managing the data transfer between a data buffer and the magnetic head and/or servo layer in a tape drive which interface with the physical magnetic tape, e.g., as will be described in further detail below.

Figure 9A:
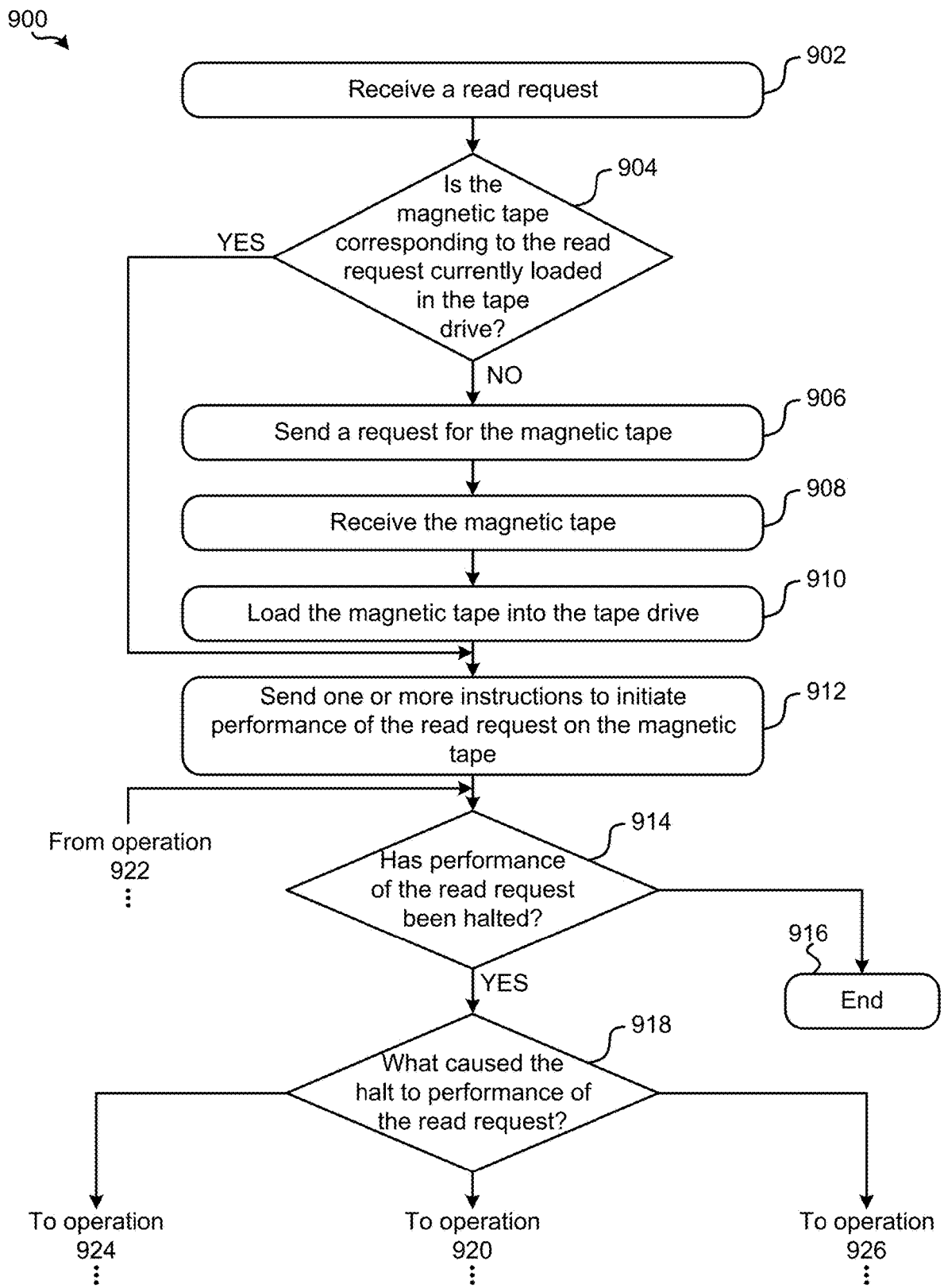
FIG. 9A is a flowchart of a method, according to one embodiment.
Figure 9A:
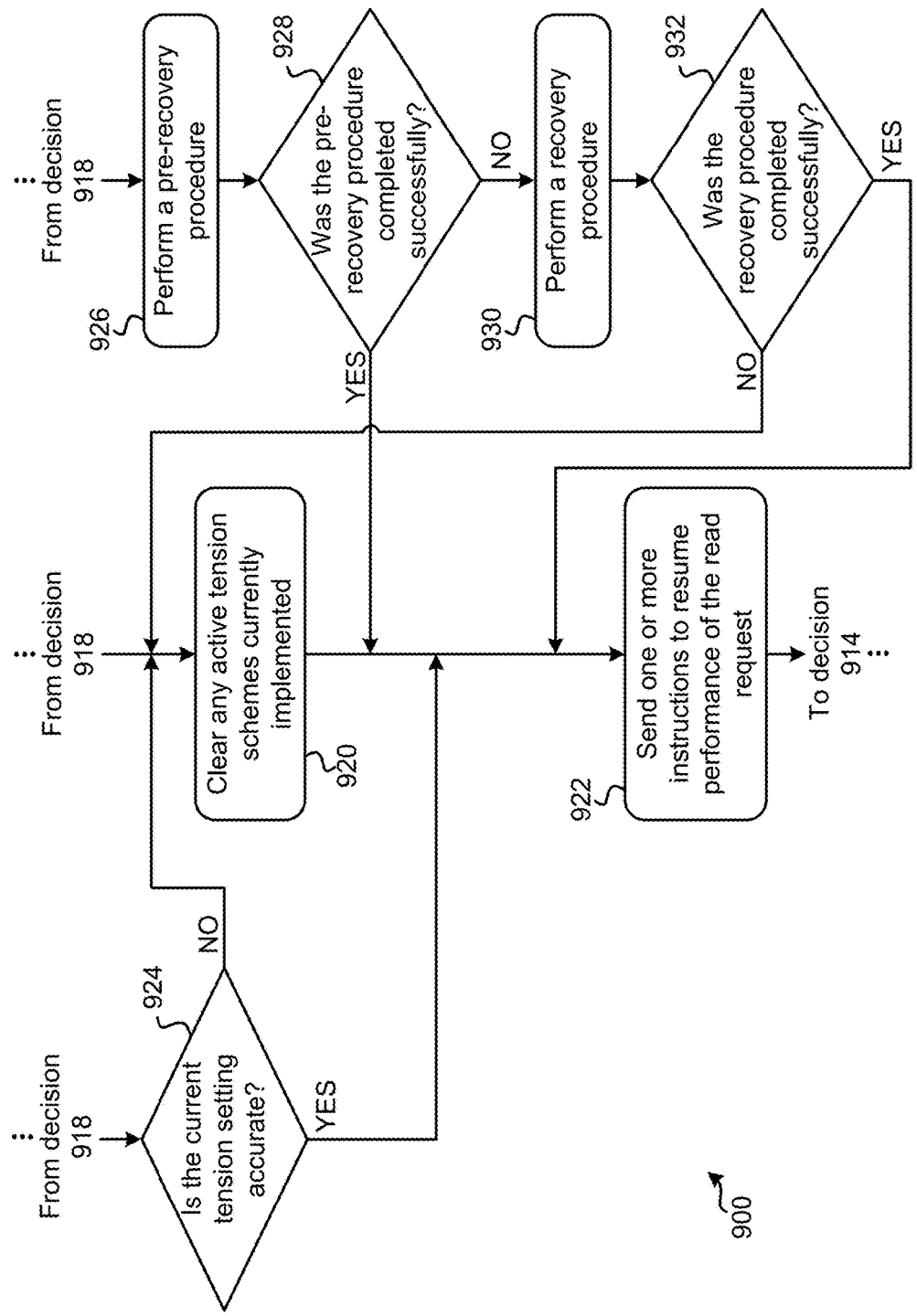

Referring now to FIG. 9A, a flowchart of a method 900 for implementing a behavior model which improves read performance for a variety of different situations is shown according to one embodiment. The method 900 may be performed in accordance with the present invention in any of the environments depicted in FIGS. 1-8B, among others, in various embodiments. Of course, more or less operations than those specifically described in FIG. 9A may be included in method 900, as would be understood by one of skill in the art upon reading the present descriptions.

Each of the steps of the method 900 may be performed by any suitable component of the operating environment. For example, in various embodiments, the method 900 may be partially or entirely performed by a controller, a processor, a computer, etc., or some other device having one or more processors therein. Thus, in some embodiments, method 900 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

It should be noted that although the various processes included in FIG. 9A may be performed by various suitable component of an operating environment, method 900 has been described in the context of being performed by a controller in an exemplary tape drive (e.g., see controller 128 in tape drive 100 in FIG. 2), which is in no way intended to limit the invention. Accordingly, it should be noted that the processes included in method 900 which include sending one or more instructions to perform an operation may be sent by the controller to an appropriate component in the tape drive, another tape drive altogether, a tape storage library controller, an automated magnetic tape accessor, etc., depending on the approach. Accordingly, in some approaches the tape drive may be positioned in a magnetic tape library, e.g., as would be appreciated by one skilled in the art after reading the present description.

Looking to the processes in FIG. 9A, operation 902 of method 900 includes receiving a read request. Depending on the approach, the read request may be received from a host (e.g., user), a tape library controller, another tape drive, etc. Upon receiving the read request, a determination may be made as to whether the magnetic tape corresponding to the read request is currently loaded in the tape drive. See decision 904. In response to determining that the magnetic tape corresponding to the read request is not currently loaded in the tape drive, method 900 proceeds to operation 906, which includes sending a request for the magnetic tape. According to some approaches, the request sent in operation 906 may be delivered to an automated magnetic tape accessor positioned in a tape library. Upon receiving the request, the automated magnetic tape accessor may locate the magnetic tape corresponding to the read request, retrieve the magnetic tape from a storage location in the tape library, and transport the magnetic tape to the tape drive.

Thereafter, operation 908 includes receiving the magnetic tape corresponding to the read request, while operation 910 includes loading the magnetic tape into the tape drive such that the magnetic tape is positioned over a magnetic head of the tape drive, e.g., as shown in FIG. 2 above. Moreover, with continued reference to FIG. 9A, operation 912 includes sending one or more instructions to initiate performance of the read request on the magnetic tape. Returning momentarily to decision 904, method 900 is shown as jumping directly to operation 912 in response to determining that the magnetic tape corresponding to the read request is already loaded in the tape drive, such that the read request may be initiated.

Initiating performance of the read request may include instructing a coarse actuator to coarse locate to a location on the magnetic tape corresponding to the read request, instructing a fine actuator to locate to a more specific location on the magnetic tape (e.g., compared to a coarse locate operation) corresponding to the read request, activating one or more read transducers on a magnetic head of the tape drive, instructing servo readers to read servo information from a servo track, etc. Once performance of the read request has been initiated, the tape drive may enter a "streaming read" state, in which the tape drive is operating at a cruise velocity, while reading consecutive datasets from the magnetic tape without pause. In other words, the tape drive enters a state in which data is being from the magnetic tape without experiencing interruption, halts, etc. This "streaming read" state may be achieved as a result of the tape drive implementing the appropriate read settings for the given situation, e.g., such as tape speed, lateral positioning of the magnetic head, read transducer activation, skew adjustment, etc.

However, this streaming read state may be interrupted for a variety of reasons, such as halts caused by full or empty read buffers, a wrap change being performed, repositioning of the magnetic head, a change in the read mode implemented, experiencing an error condition, etc. Accordingly, decision 914 includes determining whether performance of the read request has been halted, e.g., at least temporarily, prior to completion of the read request. In other words, decision 914 may include monitoring performance of the read request in order to sense the occurrence of an interruption to the streaming read state.

In response to determining that the read request has been completed without an interruption to the streaming read state, method 900 may proceed to operation 916, whereby method 900 may end. However, it should be noted that although method 900 may end upon reaching operation 916, any one or more of the processes included in method 900 may be repeated in order to perform subsequently received read requests. In other words, any one or more of the processes included in method 900 may be repeated in order to perform additional read requests.

However, returning to decision 914, method 900 proceeds to decision 918 in response to determining that performance of the read request has been halted prior to completion of the read request. There, decision 918 includes determining a cause of the halt to performance of the read request. The manner in which the tape drive may react to a halt to the streaming read state, and thereby an interruption to performance of the read request, may differ depending on the cause of the halt. Accordingly, method 900 is shown as proceeding from decision 918 differently depending on the determined cause of the halt. However, it should be noted that the number and/or type of processes branching from decision 918 are in no way intended to be limiting.

Method 900 proceeds to operation 920 in response to determining that the halt to performance of the read request was caused by a reset event. In other words, method 900 proceeds to operation 920 in response to determining that an adjustment to the performance of the tape drive resulted in the halt to performance of the read request. During operation, the tape drive may encounter situations which involve major adjustments to performance in order to continue reading data from the magnetic tape. In order to perform these adjustments, the tape drive pauses performance of ongoing operations in an effort to avoid increases to the bit error rate (BER). An illustrative list of such situations includes, but is in no way limited to, repositioning the magnetic head relative to the magnetic tape, wrap changes, adjustments to an operating mode of the tape drive, etc.

Looking to operation 920, method 900 includes clearing any active tension schemes which may be currently implemented. As alluded to above, the dimensional stability of magnetic tape is not constant. Rather, portions of a magnetic tape may contract and/or expand depending on the environment in which the magnetic tape is subjected to. For example, friction; stress produced by the tape supply cartridge and/or take-up reel; ambient (e.g., environmental) drive conditions such as temperature, humidity, etc.; etc., may have an effect on the dimensional stability of magnetic tape. One approach to counteracting this dimensional instability is to selectively adjust the amount of tension which is applied to the magnetic tape. In other words, the act of passing the magnetic tape over the magnetic head in the tape drive while performing a locate operation, a read operation, a write operation, etc., may naturally impose at least some amount of "nominal tension" on the magnetic tape.

However, by increasing or decreasing the amount of stress placed on the magnetic tape from this nominal amount of tension, dimensional instabilities may be counteracted. For instance, by increasing the tension applied to the magnetic tape along its longitudinal axis to an amount which is greater than the nominal tension, the magnetic tape may effectively be stretched such that a cross-track width of the magnetic tape decreases. Similarly, by decreasing the tension applied to the magnetic tape along its longitudinal axis to an amount which is less than the nominal tension, the magnetic tape may effectively be permitted to contract such that a cross-track width of the magnetic tape increases. Thus, at the time that the halt to performance of the read request occurs, the amount of tension applied to the magnetic tape may intentionally be offset from the "nominal tension". In other words, an active tension scheme may exist as the current tension setting.

Referring still to operation 920, it is desirable to clear any active tension schemes which may be currently implemented in response to experiencing a halt to performance of the read request caused by a reset event. As previously mentioned, major reset events may involve adjustments to performance of the tape drive in order to continue reading data from the magnetic tape. Thus, by reverting the current tension setting to a nominal tension from any active tension schemes, the tape drive may be best suited to resume performance of the read request following the resent event. It should also be noted that an active tension scheme may not be implemented in some approaches, and therefore performing operation 920 may be somewhat redundant.

Proceeding to operation 922, one or more instructions are sent to resume performance of the read request. From operation 922, method 900 returns to decision 914, whereby performance of the read request may continue to be monitored for any additional interruptions to performance of the read request.

Returning to decision 918, method 900 proceeds to decision 924 in response to determining that the halt to performance of the read request was caused by a stop in drive performance. In other words, method 900 proceeds to decision 924 in response to determining that a motor which controls movement of the take-up reel in the tape drive has stopped. Tape drive performance may stop as a result of different situations depending on the approach. For instance, operational speed matching, a full read buffer, an empty read buffer, etc. may cause tape drive performance to stop, thereby halting performance of the read request.

Decision 924 includes determining whether the current tension setting of the magnetic tape is accurate for the given situation. In other words, decision 924 includes determining whether the current tension setting implemented in the tape drive is desirable given the various settings of the given approach, or whether the current tension setting is "stale". These stale settings may develop in some approaches because settings which achieve successful performance tend to remain active until tape drive motion stops. Accordingly, this prolonged use may lead to tension settings being set longer than otherwise intended. A "stale" tension setting may thereby be understood as a tension based value which is not appropriate for the current tape location and/or read quality. As an example, a low tension setting implemented while reading data from a third of the magnetic tape located closest to an end of tape may be considered "stale". A tension setting may also be considered "stale" when read conditions and/or performance have improved such that tension error criteria are no longer met. Accordingly, the response to a detecting a "stale" tension setting may be to restore a nominal tension, e.g., as will be described in further detail below.

Decision 924 may be made following a stop in drive performance to determine if the current tension setting is appropriate for the particular location on tape that data was being read from at the time that the stop occurred. In response to determining that the current tension setting is not accurate for the given situation (e.g., the current tension setting is deemed to be "stale"), method 900 proceeds to operation 920. There, as described above, any active tension schemes which may be implemented are cleared, and the current tension setting is reverted to a nominal tension. Yet, method 900 jumps directly to operation 922 in response to determining that the current tension setting of the magnetic tape is accurate for the given situation (e.g., the current tension setting is deemed to not be "stale"), and one or more instructions are sent to resume performance of the read request.

Figure 9B:
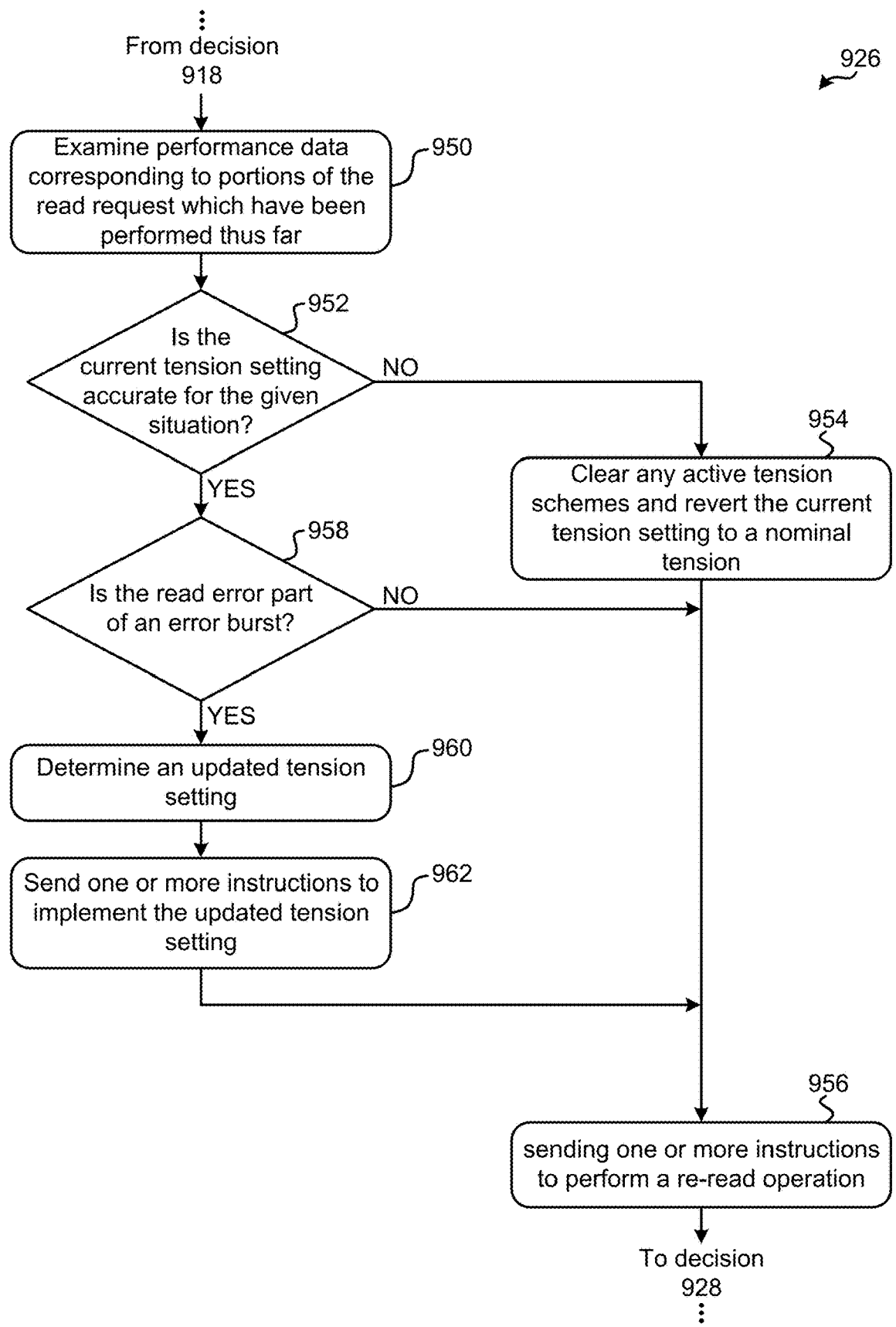
FIG. 9B is a flowchart of sub-processes used to perform one of the operations in FIG. 9A, according to one embodiment.

Returning once again to decision 918, method 900 proceeds to operation 926 in response to determining that the halt to performance of the read request was caused by a read error (e.g., data error). In other words, method 900 proceeds to operation 926 in response to detecting a read error of a dataset. There, operation 926 includes performing a pre-recovery procedure. The pre-recovery procedure includes a number of processes which are illustrated in FIG. 9B and described in further detail below.

Figure 9C:
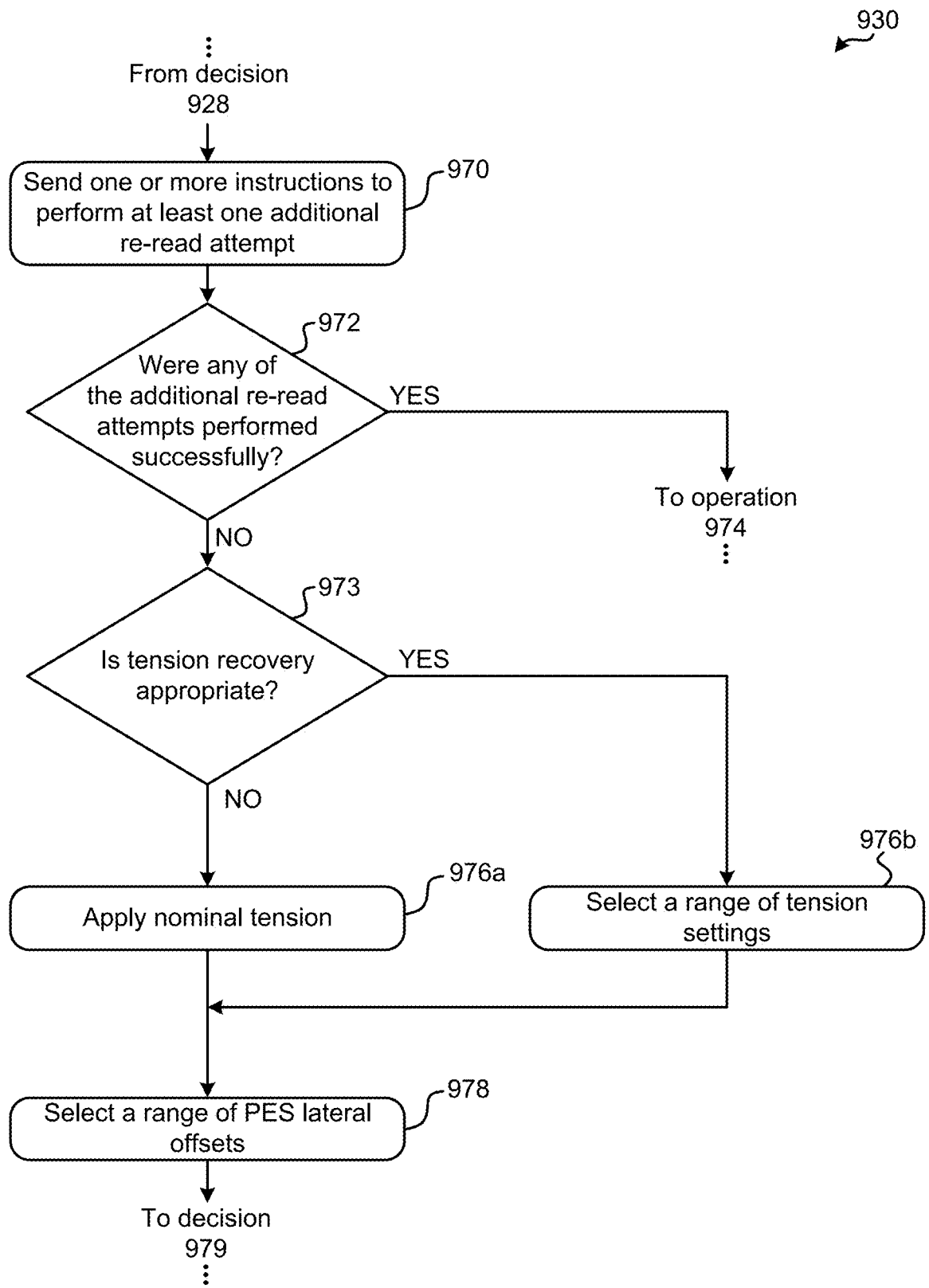
FIG. 9C is a flowchart of sub-processes used to perform one of the operations in FIG. 9A, according to one embodiment.
Figure 9C:
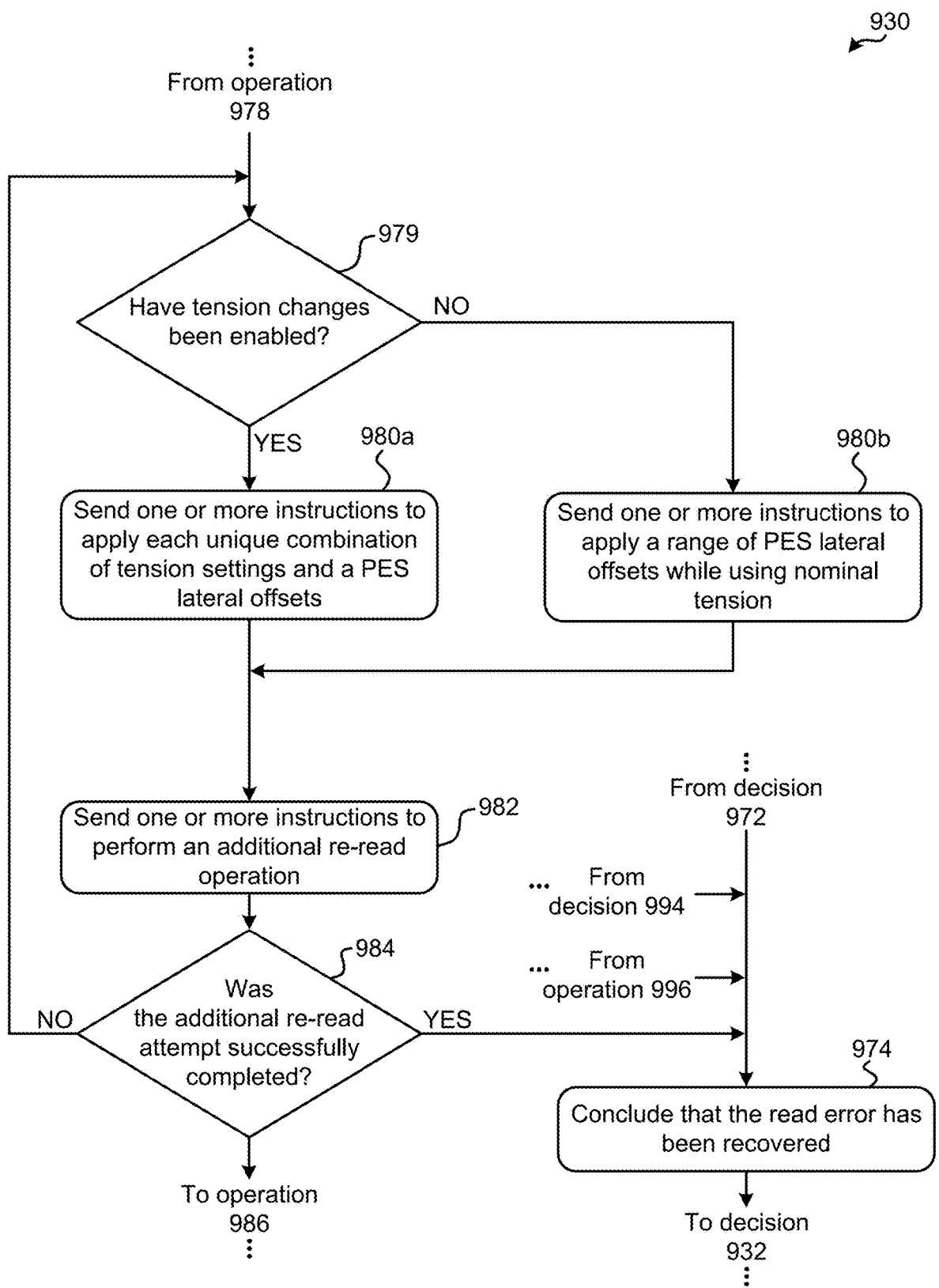
Figure 9C:
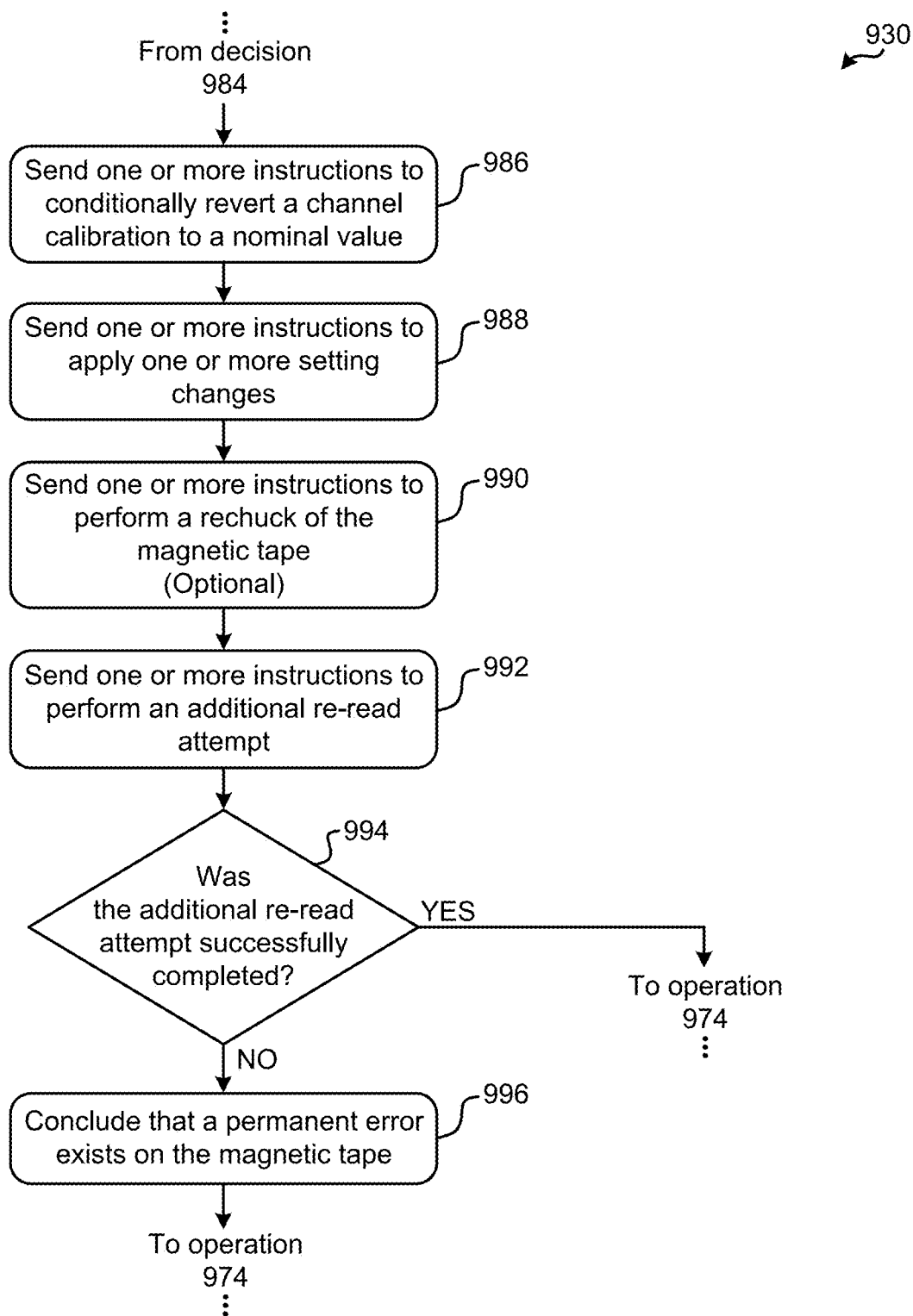

Referring still to FIG. 9A, decision 928 includes determining whether the pre-recovery procedure was completed successfully. Method 900 proceeds to operation 922 in response to determining that the pre-recovery procedure was completed successfully, whereby one or more instructions are sent to resume performance of the read request. Alternatively, method 900 may proceed to operation 930 in response to determining that the pre-recovery procedure was not completed successfully. There, operation 930 includes performing a recovery procedure. The recovery procedure also includes a number of processes which are illustrated in FIG. 9C and described in further detail below.

Again, with continued reference to FIG. 9A, decision 932 includes determining whether the recovery procedure was completed successfully. Method 900 proceeds to operation 922 in response to determining that the pre-recovery procedure was completed successfully, whereby one or more instructions are sent to resume performance of the read request. However, method 900 may return to operation 920, such that any active tension schemes which may be implemented are cleared, and the current tension setting is reverted to a nominal tension such that a remainder of the read request may be performed.

Figure 10A:
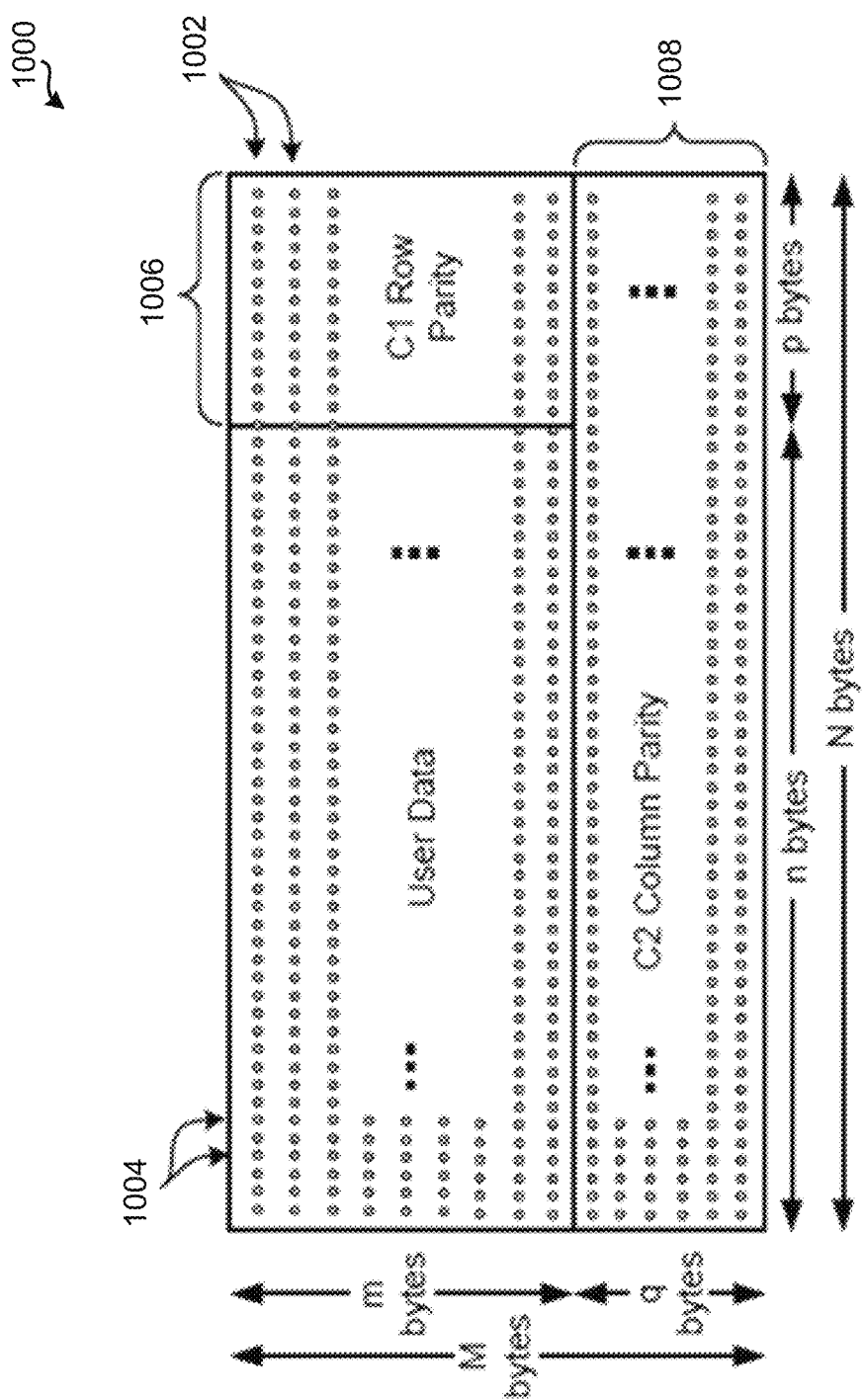
FIG. 10A is a partial representative view of a magnetic tape 1000 having a plurality of information stored thereon, according to one embodiment.

Referring momentarily to FIG. 10A, a partial representative view of a magnetic tape 1000 having a plurality of information (e.g., data) stored thereon is illustrated in accordance with one approach. When a tape drive reads data from a magnetic tape, or when a tape drive writes data to a magnetic tape, a unit of data that is read or written may be referred to as a "dataset." The dataset is encoded using interleaved sets of codewords that are organized into an error correction code (ECC)-encoded matrix of size M bytes×N bytes (M×N). This may ECC encoded matrix may then be written to magnetic tape, e.g., as shown in FIG. 10A. There are two levels of encoding within this matrix. The first level of encoding utilizes the matrix rows 1002. Each row 1002 of the matrix contains C1-ECC row parity 1006, which adds p-bytes of C1-ECC to the n-bytes of user data (e.g., N=n+p bytes). The second level of encoding, C2-ECC column parity 1008, adds q-bytes of C2-ECC to each matrix column 1004. For example, if q=12, then adding 12 bytes of C2-ECC would add 12 rows to the matrix (e.g., M=m+q bytes).

Figure 10B:
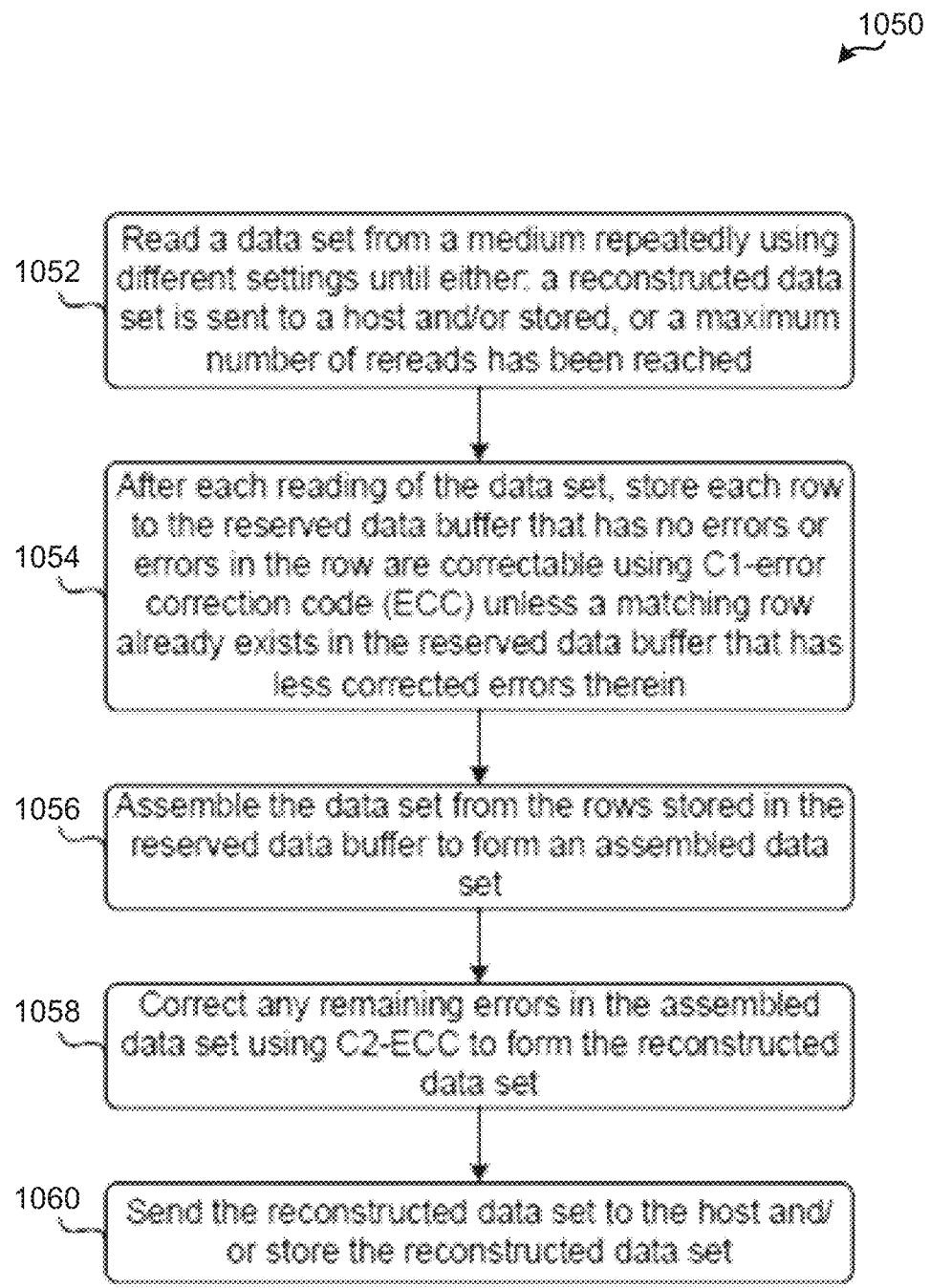
FIG. 10B is a flowchart of a method, according to one embodiment.

Moreover, looking to FIG. 10B, a flowchart with a high-level description of a method 1050 of how a sub-dataset is reconstructed (e.g., repaired), is illustrated in accordance with one exemplary approach, which is in no way intended to limit the invention. The process included in the flowchart of FIG. 10B may also be referred to as a "cut/paste" operation.

As shown, operation 1052 includes reading a dataset from a magnetic tape by repeatedly using different settings, e.g., such as tape speed, position of the magnetic head relative to the magnetic tape, etc. The repeated read attempts may continue until either a reconstructed dataset is sent to a host and/or is stored, or a maximum number of re-read attempts have been performed.

Looking to operation 1054, after each attempt of reading the dataset, each row may be stored to a reserved data buffer. According to preferred approaches, the reserved data buffer does not include errors. However, any errors that are included in the reserved data buffer may be correctable using C1-ECC, unless a matching row already exists in the reserved data buffer which has less corrected errors included therein, e.g., as would be appreciated by one skilled in the art after reading the present description.

Moving to operation 1056, the data set is assembled from the rows stored in the reserved data buffer, thereby forming an assembled data set. Moreover, any remaining errors are corrected in the assembled data set using C2-ECC to form the reconstructed data set. See operation 1058. Finally, the reconstructed data set may be sent to the host and/or may be stored in memory. See operation 1060.

It follows that the original error correction status for the dataset in error may make up what will eventually become the working copy that resides in a reserved area of the data buffer. Following each re-read attempt of the dataset from the magnetic tape, the sub-datasets are individually examined and any C1 (row) correction improvements are moved over to the working copy. C2-correction may then be performed over the columns to see if the C1 improvements are sufficient for successful C2-correction. If all 64 sub-datasets can be so repaired, the dataset may be considered readable and the working copy is moved into the normal data buffer for transfer to the host.

Looking now to FIG. 9B, exemplary sub-processes of performing the pre-recovery procedure are illustrated in accordance with one embodiment, one or more of which may be used to perform operation 926 of FIG. 9A. However, it should be noted that the sub-processes of FIG. 9B are illustrated in accordance with one embodiment which is in no way intended to limit the invention. For instance, although not illustrated in FIG. 9B, the pre-recovery process may be prefaced by a determination as to whether the detected read error occurred in an error burst on the magnetic tape. An error burst may include a group of datasets stored in close proximity to each other on the magnetic tape, each of which cause a same read error when attempting to read data therefrom. This initial determination may be desirable because, although data may not be successfully read from each of the datasets using a current drive configuration, the datasets may collectively benefit from the same or similar data recovery patterns implemented in the tape drive.

Referring still to FIG. 9B, sub-operation 950 of the pre-recovery procedure includes examining performance data (e.g., characteristics) and ECC data correction status information which corresponds to portions of the read request which have been performed thus far. Performance data includes information which provides valuable insight as to the level of success achieved while performing a given action. According to an example, which is in no way intended to limit the invention, by evaluating the distribution, correction severity, and frequency of read data error recovery sessions performed on given mount of a magnetic tape cartridge and the related BER corresponding to a concurrent set of data channels, a tape drive may be able to determine whether read errors occurred due to misalignment between the magnetic tape and transducers on a magnetic head, or another type of event which occurred during the read operation.

An exemplary list of performance data which may be examined in sub-operation 950 includes, but is not limited to, data channel performance; tension error criteria; data correction status information; read error history information; persistent tape drive settings; initial conditions and/or performance settings; environmental conditions which the tape drive is subjected to, e.g., such as ambient temperature, ambient humidity, etc.; etc. It follows that any desired type of performance data may be examined depending on the desired approach. Accordingly, the type of performance data collected during operation and stored for later evaluation may vary depending on user input, the type of operation being performed, predetermined criteria, determinations made in real-time, etc.

According to an exemplary approach, which is in no way intended to limit the invention, sub-operation 950 may further examine information corresponding to the data tracks which have been and/or are reporting higher error rates in relation to other data tracks on the magnetic tape. In severe read error cases, one or more data tracks (e.g., channels) may appear to be effectively useless as a result of signal loss while attempting to read therefrom. However, the signal loss may actually result from debris or read element mis-registration. Accordingly, each data track may be given an ineffective (e.g., "unreadable") rating based on dataflow ECC correction and re-write criteria, followed by an evaluation on the relative number and/or distribution of ineffective data tracks. For example, "nominal track performance" may correspond to situations in which between 0 and 1 data tracks are unreadable, while "low track performance" may correspond to situations in which two data tracks are unreadable. Furthermore, "poor track performance" may correspond to situations in which there are 3 or more unreadable data tracks.

The distribution of these unreadable data tracks may also be examined. The nature of tape width changes may serve as a channel degradation signature for which the outside tracks (closer to the edges of the magnetic tape along the cross-track direction) have higher error rates than the data tracks which are closer to a longitudinal axis of the magnetic tape. Skew conditions may also affect performance by causing one side of the magnetic tape to cause a higher error rate than the opposite side along the cross-track direction. As a result, a bathtub-shaped performance curve (also referred to herein as a "bathtub condition") may result, e.g., as would be appreciated by one skilled in the art.

Once the track performance has been assessed, the location of the unreadable tracks in relation to each other may be assessed. For example, in a 32-data track format, if the perceived number of unreadable tracks in the outer 6 track positions on either side of the longitudinal axis of the magnetic tape exceeds the number of tracks determined to be unreadable in the remaining 20 track positions, a "bathtub condition" may be determined to exist. However, other initial conditions may also be identified, e.g., such as whether the detected read error is part of a burst of errors, what off-nominal hardware settings are in place when the read error was detected, etc.

Referring still to FIG. 9B, from sub-operation 950, the flowchart proceeds to decision 952, which includes determining whether the current tension setting of the magnetic tape is accurate for the given situation. In other words, decision 952 includes determining whether the current tension setting implemented in the tape drive is desirable given the various settings of the given approach, or whether the current tension setting is "stale", e.g., as described above. Accordingly, any of the approaches described above in relation to performing decision 924 of FIG. 9A may be implemented while performing decision 952.

However, in preferred approaches, the determination made in decision 952 may be based, at least in part, on the examination of the performance data performed in sub-operation 950. For example, sub-operation 950 may evaluate ECC correction statistics and/or data channel performance to reveal that the read error identified at decision 918 of FIG. 9A was caused by a misalignment between the data tracks on the magnetic tape and the read transducers on the magnetic head in the tape drive (even in the absence of servo errors). Moreover, environmental conditions which the tape drive was subjected to at a point in time that the read error occurred may reveal that the misalignment was caused by a lateral expansion and/or contraction of the magnetic tape which was not incorporated in the current tension setting. The particular location at which the read error occurred on the magnetic tape may also be incorporated in the determination made in decision 952. For instance, similar locations along the length of different magnetic tapes may experience similar (e.g., reoccurring) stress profiles, e.g., as will be described in further detail below. These stress profiles may thereby be used to determine whether the current tension setting of the magnetic tape is accurate for the given situation.

With continued reference to FIG. 9B, the flowchart proceeds to sub-operation 954 in response to determining that the current tension setting is not accurate for the given situation (e.g., the current tension setting is deemed to be "stale"). There, sub-operation 954 includes clearing any active tension schemes which may be implemented, and the current tension setting is reverted to a nominal tension. As described above, by reverting the current tension setting to a nominal tension from any active tension schemes, the tape drive may be best suited to resume performance of the read request.

Accordingly, the flowchart proceeds to sub-operation 956, which includes sending one or more instructions to perform a re-read attempt on a portion of the magnetic tape corresponding to the read error. This re-read attempt may attempt re-reading data from the portion of the magnetic tape corresponding to the previously experienced read error. Attempting to re-read a portion of magnetic tape may first involve moving (e.g., rewinding) the magnetic tape such that the intended portion thereof is positioned adjacent to the read transducers on the magnetic head of the tape drive. Accordingly, the one or more instructions sent in sub-operation 956 may include a relocate command, e.g., as would be appreciated by one skilled in the art after reading the present description.

From sub-operation 956, the flowchart is shown as proceeding to decision 928 in FIG. 9A. Accordingly, in some approaches decision 928 may be determined based on whether the re-read attempt initiated by sub-operation 956 was performed successfully. In other words, the pre-recovery procedure may be deemed to have been completed successfully in response to determining that the data stored on the portion of the magnetic tape corresponding to the previously experienced read error was successfully read as a result of performing the re-read attempt. Moreover, the pre-recovery procedure may be deemed to have not completed successfully in response to determining that the data stored on the portion of the magnetic tape corresponding to the previously experienced read error was again not able to be read. It follows that method 900 in FIG. 9A may proceed to performing the recovery procedure in response to being unable to overcome (e.g., correct) the previously experienced read error.

Returning to decision 952 of FIG. 9B, the flowchart proceeds to decision 958 in response to determining that the current tension setting of the magnetic tape is accurate for the given situation (e.g., the current tension setting is deemed to not be "stale"). Looking to decision 958, here the flowchart includes determining whether the read error is part of an error burst. In other words, decision 958 includes determining whether the previously experienced read error was caused, at least in part, by an error burst. An error burst corresponds to an area on the magnetic tape which is associated with a high concentration of errors. This high concentration of errors may result from a localized product defect, manufacturing inaccuracies, write errors experienced while writing data to the area, etc. As mentioned above, in some approaches an error burst may include a group of datasets stored in close proximity to each other on the magnetic tape, each of which cause a same read error when attempting to read data therefrom due to common tape defects and/or debris signatures. However, in other approaches an error burst may be related to a marginal tension setting implemented by the tape drive. Although error bursts are often detected while attempting to read data from the magnetic tape, error bursts may be identified prior to performing a read request, e.g., by evaluating writer performance in use (read-while-write). Accordingly, decision 958 may be determined differently depending on the desired approach.

Although the flowchart is shown as proceeding to sub-operation 956 in response to determining that the read error is not part of an error burst, such that a re-read attempt may be made, the flowchart proceeds to sub-operation 960 in response to determining that the read error is part of an error burst. The high concentration of read errors experienced when attempting to read data from an error burst undesirably increases the effective BER, decreases efficiency, lengthens data access times, etc., and can lead to tape damage in cases of excess backhitching during recovery of a single dataset or multiple datasets within an error burst. In some approaches, counteracting an error burst in order to successfully read data from the corresponding portion of the magnetic tape may be achieved by applying an updated tension setting to the magnetic tape. In other words, the current tension setting may be unfit to successfully read data from the magnetic tape.

As mentioned above, the current tension setting may implement an active tension scheme in some approaches, or a nominal tension in other approaches. Accordingly, it may be desirable to determine whether the error burst corresponds to an outdated active tension scheme which is no longer adequate for the given situation, an inefficient tension scheme which should be optimized due to the fact that it is not effective at eliminating the error burst, or whether the error burst corresponds to a nominal tension setting which is no longer adequate for the given situation. This determination may allow for the flowchart to more efficiently proceed towards determining an appropriate updated tension setting to apply to the magnetic tape in an attempt to overcome the detected read error.

Thus, sub-operation 960 includes determining an updated tension setting. The updated tension setting may be used to adjust the current tension setting, and may be determined differently depending on the approach. According to some approaches, the updated tension setting may be determined using at least a portion of the performance data, other historical settings (e.g., data), read correction data, etc. As mentioned above, performance data (e.g., characteristics) includes information which provides valuable insight as to the level of success, or lack thereof, achieved while performing a given action. Accordingly, the performance data may include any of the types of performance data described in the other approaches herein. This information may be used to determine specific settings which may have contributed to a failed attempt. These specific settings may thereby be corrected (e.g., counteracted) or optimized by making updates thereto and/or other settings such as the current tension setting. For example, an error burst may have resulted from a misalignment between the magnetic head and the magnetic tape. However, by determining and applying an updated tension setting to the magnetic tape, this misalignment may be corrected, thereby allowing for the data to be read.

In some approaches, historical data concerning the successful use of tension on prior wraps in the same physical location and/or read data channel performance statistics and degradation patterns may be used to determine an updated tension setting to apply. Using the historical data and/or the read correction data to determine an updated tension setting may further include counting a number of data tracks (also referred to herein as "channels") on the magnetic tape that are unreadable. Moreover, based on the number and arrangement of the unreadable data tracks, this process may additionally include assessing whether the unreadable data tracks have an overall channel degradation pattern which affects channels which are located closer to an edge of the magnetic tape (along the cross-track direction) more than channels which are located closer to a longitudinal axis of the magnetic tape. This type of error profile may correspond to a bathtub-shaped performance curve, or "bathtub condition" as mentioned above. Attempts to improve poor read performance caused by bathtub conditions combined with multiple unreadable data channels may be made, e.g., as will be described in further detail below.

In still other approaches, the updated tension setting may be determined by using a lookup table. The lookup table may include a range of desired tension settings which correspond to various environmental conditions, material compositions of the magnetic tape, a location along the length of the magnetic tape that the error burst is located, etc.

The flowchart additionally includes sending one or more instructions to implement the updated tension setting that was determined. See sub-operation 962. Implementing the updated tension setting effectively adjusts the current tension setting of the magnetic tape such that the magnetic tape is stretched farther or allowed to contract. As a result, the width of the magnetic tape as measured in the cross-track direction may increase or decrease depending on the updated tension setting implemented. This lateral expansion or contraction of the magnetic tape is preferably able to counteract the error burst and allow for data to be read from the corresponding portion of the magnetic tape successfully.

The processes involved with implementing the updated tension setting may vary depending on the approach. For instance, the manner in which the updated tension setting is determined may have an effect on the implementation process. In other approaches, the current tension setting may have an effect on the implementation process of the updated tension setting.

As mentioned above, the current tension setting may already have an active tension scheme implemented which has proven to be unsuccessful (e.g., inadequate) in reading data from the error burst. Alternatively, a tension scheme may be seen as insufficient or inefficient, implying that datasets can be read, but only by using error recovery vs. data streaming, and therefore may not be optimized sufficiently to eliminate an error burst scenario. In these approaches, implementing the updated tension setting may include a "seeding" process. Thus, the one or more instructions sent in sub-operation 962 may specify to "seed" the updated tension setting in an attempt to overcome the error burst. Seeding the updated tension setting may include setting a tension level index to the updated tension setting such that subsequent operations will be performed with the updated tension setting implemented, e.g., as would be appreciated by one skilled in the art after reading the present description.

In other approaches, the current tension setting may still be set to the nominal tension, whereby the nominal tension may have proven to be unsuccessful in reading data from the error burst. In these approaches, implementing the updated tension setting may include a "forced" process. Thus, the one or more instructions sent in sub-operation 962 may specify to "force" the updated tension setting in an attempt to overcome the error burst. Forcing the updated tension setting may include anticipating that an updated tension setting is desired and applying a lowest tension value in a range determined in sub-operation 960, e.g., as would be appreciated by one skilled in the art after reading the present description.

From sub-operation 962, the flowchart proceeds to sub-operation 956 whereby a re-read attempt may be made with the updated tension setting implemented.

Looking now to FIG. 9C, exemplary sub-processes of performing the recovery procedure are illustrated in accordance with one embodiment, one or more of which may be used to perform operation 930 of FIG. 9A. However, it should be noted that the sub-processes of FIG. 9C are illustrated in accordance with one embodiment which is in no way intended to limit the invention. For instance, although not illustrated in FIG. 9C, the recovery process may be prefaced by a determination as to whether adjustments to the tension setting are applicable based on historical data, read correction data, etc. Read correction data may be assessed by counting the number of channels on the magnetic tape from which data may not be readable, e.g., which appear "dead". Moreover, an assessment as to whether these dead channels have an overall channel degradation pattern which affects the outer channels more than the inner channels may be performed. In some approaches this assessment may be performed by evaluating servo data. Furthermore, a choice may be made as to whether a nominal tension should be applied for the duration of recovery if tension criteria is not met, or whether a range of tension settings should be selected and applied for each subsequent retry if tension criteria is met, e.g., as would be appreciated by one skilled in the art after reading the present description.

A tension change may be enabled as a part of a specialized recovery procedure which may be applied under a limited set of circumstances, as tension is typically not used in the normal set of options used during general recovery. According to the present description, "general recovery" may be understood as a pre-determined set of retry operations which are to be performed in combination with dataflow configuration changes, channel calibration changes, servo changes, speed variations, etc. Therefore, although the general recovery procedure may be used when tension changes are enabled, tension is typically managed as an operating mode change. In some approaches, the environment of general recovery may expand to include the additional variable of changing tension.

Referring still to FIG. 9C, sub-operation 970 of the recovery procedure includes sending one or more instructions to perform at least one additional re-read attempt. However, the number of additional re-read attempts may vary depending on the approach. For instance, sub-operation 970 may include sending one or more instructions to perform two additional re-read attempts, three additional re-read attempts, four additional re-read attempts, etc. In order to reduce the use of tension, the one or more additional re-read attempts may be performed at the nominal tension setting and/or while implementing a minimal amount of dataflow changes. However, any current tension settings may be maintained during one or more of the additional re-read attempts in other approaches.

Proceeding to decision 972, a determination is made as to whether any of the additional re-read attempts were performed successfully. Tension recovery involves dealing with track misregistration which may vary depending on the data channel. As a result, the odds of successfully reading a dataset from magnetic tape on a single re-read attempt (also referred to herein as a "read retry") decrease as the amount of tape distortion and channel degradation increases. Therefore, reconstructive methods may be used in tandem during recovery in an attempt to iteratively repair a dataset in a separate buffer location during re-read attempts. Each re-read attempt may be performed with any combination of tension settings, PES offset, a variety of hardware modifications, etc. Moreover, the reconstruction may be performed on a sub-dataset basis. According to an example, there may be 64 sub-datasets per dataset for a given recording format. Thus, in the course of processing a dataset, each data channel may write and/or read a copy of the 64 sub-datasets. It follows that, depending on how well the read signal quality can be improved, the sub-datasets may be repaired using data from one or more data channels over the course of performing multiple read retries.

The flowchart proceeds to sub-operation 974 in response to determining that any of the additional re-read attempts (e.g., including dataset repair ongoing with results of each retry in a separate buffer location) were performed successfully, whereby it may be concluded that the read error has been recovered. From sub-operation 974, the recovery procedure may be exited, thereby returning to decision 932 in FIG. 9A. It follows that in some approaches, decision 932 may be determined based on whether any of the additional re-read attempts were performed successfully, thereby recovering the read error. In other words, the recovery procedure may be deemed to have been completed successfully in response to determining that the data stored on the portion of the magnetic tape corresponding to the previously experienced read error was successfully read as a result of performing the recovery procedure.

Referring still to FIG. 9C, the flowchart proceeds from decision 972 to decision 973 in response to determining that none of the additional re-read attempts were performed successfully. There, decision 973 includes determining whether performing a tension based recovery procedure is appropriate for the given situation. As shown, the flowchart further proceeds to sub-operation 976a in response to determining that performing a tension based recovery procedure is appropriate. There, sub-operation 976a includes applying the nominal tension for the duration of the recovery procedure. However, the flowchart may proceed to sub-operation 976b in response to determining that performing a tension based recovery procedure is appropriate. There, sub-operation 976b includes selecting a range of tension settings from a tension table. Each of the tension settings included in the range selected may be applied during each subsequent re-read attempt in an effort to recover the previously experienced read error, e.g., as will be described in further detail below. Accordingly, the range of tension settings selected preferably corresponds to the severity of the read error itself and/or a location on the magnetic tape where the read error occurred.

As mentioned above, magnetic tape is subjected to stress while in use (e.g., loaded in a tape drive) and also while stored on a tape supply reel. During use, tension is applied to the magnetic tape as it is unwound from the supply reel, passed over the magnetic head, and wound onto the take-up reel. Accordingly, a nominal amount of tension is involved with performing read and/or write operations on the magnetic tape, but a higher or lower amount of tension may be selectively applied to the magnetic tape depending on the desired approach. While wound on a supply reel however, cartridge pack stress causes portions of the magnetic tape wound radially closer to the center of the reel (e.g., the hub) to experience more stress than portions of the magnetic tape which are wound radially farther from the center of the reel. This is primarily because each layer (or wrap) of magnetic tape stored on a tape reel exerts pressure on the layers positioned below. Accordingly, portions of the magnetic tape closer to the center of the reel are compacted by the pressure of the numerous layers of magnetic tape wrapped above, and as a result, may have a larger cross-track width than portions of the magnetic tape that are positioned radially farther from the center of the tape reel. It follows that the amount of tension applied to a given portion of a magnetic tape may depend on where it is located along the length of the magnetic tape (which runs parallel to a longitudinal axis of the magnetic tape).

For instance, an amount of tension which is greater than the nominal tension may be applied to portions of the magnetic tape which are closer to an end of tape, as they are wrapped closer to the center of the tape reel when stored, in comparison to portions of the magnetic tape which are closer to a beginning of tape and wrapped farther from the center of the tape reel when stored. Again, the increased stress exerted on these portions of the magnetic tape which are closer to an end of tape effectively causes the magnetic tape to widen along the cross-track direction. Applying a tension which is greater than the nominal tension compensates for this increased width by causing the data tracks to pull towards each other along the cross-track direction, and desirably align with the read transducers on a magnetic head of the tape drive. Conversely, an amount of tension which is lower than the nominal tension may be applied to portions of the magnetic tape which are wrapped farther from the center of the tape reel in comparison to portions of the tape which are wrapped closer to the center of the tape reel. This reduced tension effectively allows the magnetic tape to contract, thereby causing the data tracks to expand away from each other along the cross-track direction, and desirably align with the read transducers.

Figure 9D:
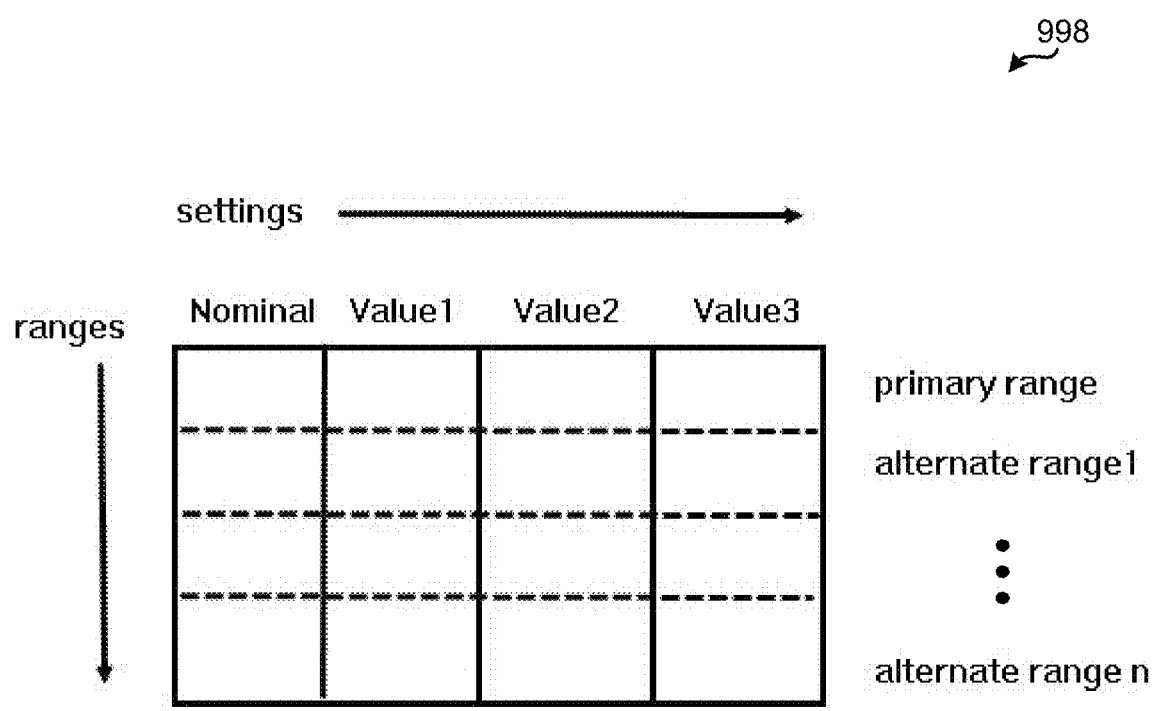
FIG. 9D is representative view of a tension table, according to one embodiment.

Referring momentarily to FIG. 9D, an exemplary tension table 998 is illustrated in accordance with one embodiment. As an option, the present tension table 998 may be implemented in conjunction with features from any other embodiment listed herein, such as those described with reference to the other FIGS., such as FIGS. 8A-8C. However, such tension table 998 and others presented herein may be used in various applications and/or in permutations which may or may not be specifically described in the illustrative embodiments listed herein. Further, the tension table 998 presented herein may be used in any desired environment. Thus FIG. 9D (and the other FIGS.) may be deemed to include any possible permutation.

As shown, the tension table 998 includes a plurality of columns and rows, each of which have been labeled. As a preliminary matter, it should be noted that the number of columns and/or rows included in tension table 998 is in no way intended to be limiting. Rather, a tension table may include any number of desired columns and/or rows, e.g., depending on the approach. The rows have been labeled primary range, alternate range 1, . . . , alternate range n, each of which corresponds to a different tension range. Moreover, the columns have been labeled Nominal, Value 1, Value 2, and Value 3, each of which correspond to a different tension setting.

The various tension settings included in tension table 998 may be applied differently depending on the situation. For instance, in a normal case, the tension setting is updated to Value 1 for the tension range is selected. In another example, a first case may correspond to a situation in which Value 3 is determined as being enabled as the primary active range at the start of a recovery procedure enacted in response to experiencing poor track performance. The poor track performance may correspond to a "bathtub condition" as described herein which is related to an error burst on the magnetic tape. Even if the primary range seems appropriated for the given situation, it may be preferred that the next closest alternate range is selected to be applied for the recovery session. Moreover, a second case may correspond to a situation in which Value 1 of an active tension range is enabled. Although Value 1 may appear to be sufficient, it may not be able to adequately overcome an error burst. In situations where the tension setting is sufficient, read errors rarely involve performing enough re-read attempts to advance a tension setting. Thus, although data may be partially readable, performance is undesirable. In an attempt to counteract this type of situation related to this second case, the tension setting in Value 2 is preferably enacted at the start.

Furthermore, a third case may correspond to situations where a nominal tension is active when an error burst is experienced and tension criteria is met. Alternatively, the third case may correspond to historical success in using tension at the given location on the magnetic tape and/or another wrap on the same mount. Accordingly, the third case may involve selecting the primary range and applying Value 1 to start.

It follows that the tension table used to perform sub-operation 976b may include groups of tension setting ranges which may be selected from. In some approaches, the tension ranges included in the tension table may be separated into groups. Each group may include a subset of the tension setting ranges which correspond to a particular type of tension setting range. According to one example, which is in no way intended to limit the invention, the tension table may include a plurality of tension setting ranges which are separated into a higher tension group and a lower tension group. The tension settings included in the higher tension group may be used in situations involving a read error which occurred on a second half of the magnetic tape which is closer to the end of tape than the first half, while the tension settings included in the lower tension group may be used in situations involving a read error which occurred on the first half of the magnetic tape. However, according to other approaches, the tension settings included in the higher tension group may be used in situations involving a read error which occurred on a third of the magnetic tape which is closest to the end of tape, while the tension settings included in the lower tension group may be used in situations involving a read error which occurred on a third of the magnetic tape which is closest to the beginning of tape. It follows that in some approaches, a nominal tension may be selected for read errors which occur on the middle (center) third of the magnetic tape.

The intended direction of tape travel may also be taken into consideration when selecting a tension range. For instance, if the magnetic tape is moving in a "forward direction" such that the magnetic head is progressing from a middle third of the magnetic tape towards an end of tape, a tension range selected from the higher tension group may be used. However, if the magnetic tape is moving in a "backward direction" such that the magnetic head is progressing from a middle third of the magnetic tape towards a beginning of tape, a tension range selected from the lower tension group may be used.

The multiple tension ranges (or "rows") included in the tension table may correspond to a severity of the situation. For example, the different tension ranges may correspond to the extent of misalignment between the data tracks on the magnetic tape and the read transducers on the magnetic head. At a minimum, the tension table preferably includes a default tension range with nominal limits, in addition to an alternate tension range with expanded limits. However, any desired number of tension ranges, each having any desired set of limits and/or sequence of tension settings, may be implemented. The sequence of tension settings included in a given tension range may be applied to the magnetic tape in a wrapped fashion which incorporates a nominal tension setting that is applied at the wrap point (e.g., "return to start"). Accordingly, the range of tension settings selected in sub-operation 976b may be applied to the magnetic tape in a systematic manner, e.g., as would be appreciated by one skilled in the art after reading the present description.

However, selectively adjusting the tension applied to the magnetic tape alone may not be sufficient to correct certain read errors. Accordingly, tension adjustments may be used on each read retry performed by the recovery session in combination with other hardware configuration and/or speed changes which may be applied. As a result, tension changes may be able to significantly improve iterative decode and dataset reconstruction results. During the course of general recovery, lateral offsets may also be applied to the magnetic head. As a result, the relative position of the read transducers with respect to the data tracks may be adjusted while also adjusting the separation between each of the data tracks themselves. Moving to sub-operation 978, a range of position error signal (PES) lateral offsets is also selected. The PES lateral offsets may be selected from a PES table which includes a plurality of offset ranges. As alluded to above, changes to the tension settings may be applied concurrently with the selected range of PES offset values, e.g., as will be described in further detail below.

The multiple offset ranges (or "rows") included in the PES table may correspond to a severity of the situation. For example, the different PES lateral offset ranges may correspond to the extent of misalignment between the data tracks on the magnetic tape and the read transducers on the magnetic head. At a minimum, the tension table preferably includes a default offset range with nominal limits, in addition to at least one alternate offset range with expanded limits. However, any desired number of PES lateral offset ranges, each having any desired set of limits and/or sequence of lateral offset settings, may be implemented. According to an exemplary approach, a primary row of the PES table may include nominal PES offsets which are able to laterally move the magnetic head above and/or below a respective centerline by an amount which is up to 85% of the track pitch.

In other words, applying the unique combinations of tension and lateral offset settings may result in a relative offset between a read transducer on the magnetic head in the tape drive and a corresponding data track on the magnetic tape. Moreover, the relative offset may be applied to the track margin above and/or below the track centerline on the magnetic tape. While default PES offset ranges may extend up to about 85% of the track pitch (the width of the data track measured in the cross-track direction), alternate PES offset ranges described herein may exceed the track margin. For example, some PES offset ranges may be greater than about 100%, greater than about 120%, about 150%, etc. of the track pitch, but may be higher or lower depending on the diagnosed error condition. Moreover, an alternate row of the PES table may be used in situations involving poor track performance, perceived off-track write, and/or alternate tension range(s). In some approaches, certain PES lateral offsets may only be implemented in combination with tension changes, while other PES lateral offsets may be implemented during normal (e.g., general) use of the tape drive and a nominal tension.

The PES lateral offsets included in a given range may be applied to the magnetic head in a wrapped fashion, e.g., as described above. Accordingly, the range of PES lateral offsets selected in sub-operation 978 may be applied to the magnetic tape in a systematic manner, e.g., as would be appreciated by one skilled in the art after reading the present description.

Referring still to FIG. 9C, decision 979 includes determining whether tension changes have been enabled. The flowchart may proceed to sub-operation 980b in response to determining that tension changes have not been enabled for the given approach. There, sub-operation 980b includes sending one or more instructions to apply the PES lateral offset values from the range selected in sub-operation 978 while the nominal tension is applied. As described above, decision 973 determines whether tension recovery is appropriate for the given situation, and proceeds to sub-operation 976a in response to determining that tension recovery is not appropriate. In such approaches, it is preferred that the nominal tension is maintained while the PES lateral offsets included in the range selected are applied to the magnetic head.

However, the flowchart may proceed to sub-operation 980a in response to determining that tension changes have been enabled for the given approach. Sub-operation 980a includes sending one or more instructions to apply each unique combination of a tension setting from the selected range of tension settings and a PES lateral offset from the selected range of PES lateral offsets. As described above, selectively adjusting the tension applied to the magnetic tape alone may not be sufficient to correct certain read errors. Accordingly, a lateral offset may be applied to the magnetic head in addition to applying a tension setting to the magnetic tape. This allows for the relative position of the read transducers with respect to the data tracks to be adjusted while also adjusting the separation between each of the data tracks themselves.

In an attempt to address data track misalignment, PES lateral offsets are preferably modified together with changes to the tension setting, e.g., in an effort to reread the dataset with different acquisition on different tracks. Each of the tension settings included in the selected range of tension settings are preferably combined with each of the lateral offsets included in the selected range of lateral offsets in a systematic manner. In other words, the tape drive may ensure that each unique combination of entries in each of the selected ranges are applied and tested to determine whether the detected read error may be corrected (e.g., overcome). More specifically, the use of PES lateral offsets changes the servo tracking above and below the nominal track pitch centerlines. In this way different read retries performed at different PES lateral offsets and tension settings may result in different sets of data tracks being read at a reasonable signal strength. Thus, although it may not be possible to read all data tracks (channels) simultaneously, the tape drive may be able to overcome the read error. Each re-read attempt may also include reconstructing the failed dataset at the subdataset level using results of partial ECC correction and/or iterative decode operations to copy correctable sub-datasets into a working copy. This improves the likelihood of recovering the dataset in pieces, thereby ultimately overcoming the read error.

Accordingly, sub-operation 982 includes sending one or more instructions to perform an additional re-read attempt on the portion of the magnetic tape corresponding to the read error for each of the unique combinations applied as a result of sub-operation 980a. Moreover, decision 984 includes determining whether the additional re-read attempt was successfully completed for the applied combination of tension setting and lateral offset.

The flowchart returns to decision 979 in response to determining that the additional re-read attempt was not successfully completed for the currently applied tension setting and lateral offset combination. From decision 979, the flowchart may proceed to sub-operation 980a, whereby one or more instructions to apply a different unique combination may be sent to the tape drive, after which one or more instructions to perform a corresponding additional re-read attempt may be sent. Alternatively, the flowchart may proceed from decision 979 to sub-operation 980b as described above. It follows that sub-processes 979, 980a or 980b, 982, and 984 may be repeated in an iterative fashion for each of the unique combination of a tension setting from the selected range of tension settings and a lateral offset from the selected range of lateral offsets. In other words, each lateral offset setting from the selected range may be applied in combination with each tension setting from the range of tension settings. However, upon determining that the additional re-read attempt was successfully completed or successfully repaired the working copy of the dataset for an applied tension setting and lateral offset combination, the flowchart is seen as progressing to sub-operation 974, whereby the recovery procedure may be exited as described above.

However, in some approaches none of the unique combination of tension settings and lateral offsets may be able to achieve a successful re-read attempt. In response, a variety of servo, dataflow, calibration, etc. based changes may further be made in combination with the sequential tension settings, e.g., as will soon become apparent. Before proceeding to this variety of retries that follow completion of lateral offsets in combination with tension adjustments, it can happen in extreme cases that channel calibration has mis-adapted to the area of tape under recovery. Thus, upon determining that each of the possible unique tension/offset combinations have been unable to successfully read the data corresponding to the previously detected read error, the flowchart proceeds to sub-operation 986. There, sub-operation 986 includes sending one or more instructions to conditionally revert a channel calibration to a nominal value.

The various adjustments to tension settings, the lateral position of the magnetic head, etc., may also have an effect on a channel calibration of the tape drive. Accordingly, the channel calibration may be different than a "nominal" value. Reverting the channel calibration to the nominal value may improve data detection and thereby increase the possibility of correcting the read error on a subsequent re-read attempt.

Furthermore, sub-operation 988 includes sending one or more instructions to apply one or more setting changes. As mentioned above, a variety of servo, dataflow, etc. based changes may be made in combination with the sequential tension settings. Accordingly, the one or more setting changes instructed in sub-operation 988 may correspond to (e.g., adjust) dataflow, channel calibration, servo orientation, magnetic tape speed, etc., depending on the desired approach. In other approaches, sub-operation may include sending one or more instructions to apply dataset reconstruction and/or iterative decode operations in combination with tension changes, lateral offset changes and other hardware configuration changes. These adjustments may be made in an attempt to re-assemble the dataset corresponding to the read error on a sub-dataset basis, e.g., as would be appreciated by one skilled in the art after reading the present description.

Optional sub-operation 990 includes sending one or more instructions to perform a rechuck of the magnetic tape. In other words, one or more instructions to remove and reload the magnetic tape in the tape drive may be performed. This may resolve some misalignment issues which may be contributing to the inability to read data from the magnetic tape, e.g., as would be appreciated by one skilled in the art after reading the present description.

Furthermore, sub-operation 992 includes sending one or more instructions to perform an additional re-read attempt on the portion of the magnetic tape corresponding to the read error. As mentioned above, dataset reconstruction may be performed on single dataset re-read attempts (also referred to as a "cut/paste" or "CP" operation), or on multiple datasets (also referred to as a "multi-cut/paste" or "MCP" operation). Reconstructive methods may be used over more than one dataset at a time in an attempt to minimize excessive backhitching performed while attempting to re-read a dataset from tape in a given recovery session, as well as excessive backhitching caused by repeated error recovery sessions which may be experienced during error burst scenarios, where data correction errors are occurring in close proximity.

Reconstructive methods may be applied to more than one dataset at a time in an attempt to minimize excessive backhitching while attempting to re-read a dataset from tape (e.g., performing a "retry") in a given recovery session, as well as excessive backhitching due to repeated error recovery sessions, e.g., such as in an error burst scenario during which data correction errors are occurring in close proximity. The tape drive may be allowed to read the initial dataset in error as well as 'n' additional datasets along the length of the magnetic tape. Each of these n+1 datasets may be read while applying the same tension setting, PES offset, hardware configuration changes, etc., for a given read retry. Also, each of the n+1 datasets may undergo reconstructive error correction procedures with each read retry. For instance, as long as the first dataset cannot be read, successive read retries may restart from the first dataset and read through the $n^{th}$ dataset. However, once the first dataset is recovered, it is possible that the remaining datasets may also be recovered. Accordingly, reading may resume at dataset n+1, or at the first dataset following the first dataset which corresponds to a subsequent read error. It should be noted that in some approaches, a decision may be made as to whether a MCP or CP operation will be performed in an attempt to recover an unreadable dataset. Moreover, this decision may be performed at the start of an error recovery procedure, such that each read retry is performed similarly in order to minimize backhitching and potential tape damage.

Accordingly, referring back to FIG. 9C, in some approaches sub-operation 992 may include reading the original dataset in error, as well as "n" additional adjacent datasets. This reading scheme may help reduce backhitching under high and/or low tension settings. Moreover, a block of datasets may be recovered simultaneously in a single recovery session, assuming the additional re-read performed in sub-operation 992 is completed successfully.

Following sub-operation 992, decision 994 includes determining whether the additional re-read attempt was successfully completed. In some approaches, decision 994 may include determining whether the dataset was successfully repaired in a reserved buffer location, e.g., as would be appreciated by one skilled in the art after reading the present description. The flowchart proceeds to sub-operation 974 in response to determining that the additional re-read attempt was successfully completed, whereby the recovery procedure may be exited as described above. Alternatively, the flowchart may proceed to sub-operation 996 in response to determining that the additional re-read attempt was not successfully completed. Upon reaching operation 996, it may be determining that a permanent error exists on the magnetic tape. In other words, it may be concluded that the read error was caused by a permanent error on the magnetic tape and/or in the data itself.

Motion of the magnetic tape may stop as a result of discovering the permanent error. This tape motion stop may allow a host interface that issued the initial read request to catch up to the buffered read command. Further action taken in response to the permanent error may vary depending on the tape drive state corresponding to the time the permanent read error was reported to the host, e.g., as a notification that at least a portion of the read request may not be performed. For instance, if the tape drive is in a "readahead mode" during which the tape drive is filling a data buffer faster than the host can retrieve it, then permanent error reporting may be deferred. However, if the host terminates the read command or otherwise stops prior to the unreadable dataset corresponding to the permanent error, then the permanent error may not be reported at all.

From sub-operation 996, the flowchart proceeds to sub-operation 974, whereby the recovery procedure may be exited as described above. It follows that decision 932 in FIG. 9A may be determined based on whether the recovery procedure identified a permanent error.

According to an in-use embodiment, which is in no way intended to limit the invention, upon detecting a "bathtub condition" and poor data track performance, the tension based recovery procedure may be entered. Accordingly, each re-read attempt which implements various configuration changes will be performed with at least some tension applied to the magnetic tape. As described above, a higher and lower tension groups in a tension table may be used to select a tension range to apply. Each respective group in the table may have a range of tension settings, although more ranges are not precluded. The lower tension (e.g., "primary") range is preferably used with moderate track performance and/or moderate ECC correction for which the number of uncorrectable sub-datasets is under a threshold number. Above that threshold number, signal quality may be so poor that processes may not be able to perform iterative decode operations, e.g., due to resulting time penalties. In cases of poor track performance and excessive sub-dataset errors, the higher tension (e.g., "alternate") range having higher tension limits may be implemented.

Each tension range may be defined as row in the tension table, while each column in the tension table may include a different tension setting. The first column 'column 0' may correspond to a default, or "nominal tension" value corresponding to the particular magnetic tape. Moreover, 'column 1' through 'column n' may have increasing or decreasing tension values depending on whether the columns are included in the higher or lower tension groups, respectively. One implementation may implement n=3, thereby resulting in a total of 3 tension settings per tension range.

Furthermore, tension may be applied in a wrapped fashion, where a first tension setting applied is taken from column 1, followed by a tension setting taken from column 2, and thereafter a tension setting from column 3. Thereafter, the index may wrap back to column 0 in order to apply a nominal tension, followed by a tension setting from column 1 again, and so forth. The cyclical re-application of the nominal tension allows for recovery which ends with the nominal tension applied. This prevents tension changes from being unnecessarily applied moving forward. Furthermore, on occasion logic may initiate optimization of the recovery procedure in cases involving poor track performance, even when a "bathtub condition" is not present and/or is not consistently present. In cases where prior wraps have successfully used tension changes in that location on a same tape mount, then the recovery procedure may selectively be implemented in situations when normal operating criteria is not met.

It follows that the various embodiments described herein may be able to improve tape drive performance, reduce BERs, increase efficiency, etc. These improvements are particularly desirable in situations where historical write servo spacing data is blocked, invalid, unavailable, etc. For instance, in tape library environments, multiple different tape drives may append (write) data onto the same magnetic tape over time. Moreover, some tape drives may have written with code levels that do not support and/or supply write servo spacing information, while other tape drives do.

These improvements are also particularly noticeable in comparison to the shortcomings of conventional products. For instance, during the course of error recovery, changes to the tension experienced by a magnetic tape however are considered to be specialized and are not implemented during nominal tape drive operation of these conventional products. Rather, tension based adjustments may be reserved for exceptionally poor read performance situations, unique recording channel degradation signatures, and other factors associated with track misregistration. Further still, even when implemented, this higher level error recovery does not consider or integrate servo spacing data into its implementation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive-implemented method, comprising:
    detecting a read error;
    determining whether the read error is part of an error burst;
    sending one or more instructions to perform a first re-read attempt on a portion of a magnetic tape corresponding to the read error in response to determining that the read error is not part of an error burst;
    determining whether the first re-read attempt was performed successfully;
    selecting a range of tension settings in response to determining that the first re-read attempt was not performed successfully;
    selecting a range of lateral offsets;
    sending one or more instructions to apply each unique combination of a tension setting from the range of tension settings and a lateral offset from the range of lateral offsets;
    for each of the unique combinations applied, sending one or more instructions to perform a second phase re-read attempt on the portion of the magnetic tape corresponding to the read error; and
    determining whether the second phase re-read attempt was performed successfully for any of the unique combinations.

2. The tape drive-implemented method as recited in claim 1, comprising:
    sending one or more instructions to revert a channel calibration to a nominal value in response to determining that the second phase re-read attempt was not performed successfully for any of the unique combinations;

sending one or more instructions to apply one or more setting changes;

sending one or more instructions to perform a third phase re-read attempt on the portion of the magnetic tape corresponding to the read error; and determining that a permanent error exists on the magnetic tape in response to determining that the third re-read attempt was not performed successfully.

3. The tape drive-implemented method as recited in claim 2, wherein the one or more setting changes correspond to settings which are selected from a group of settings consisting of: dataflow, channel calibration, servo orientation, and magnetic tape speed.

4. The tape drive-implemented method as recited in claim 2, comprising:

prior to sending the one or more instructions to perform the third phase re-read attempt, sending one or more instructions to perform a rechuck of the magnetic tape.

5. The tape drive-implemented method as recited in claim 1, comprising:

using a table to determine an updated tension setting in response to determining that the read error is part of an error burst; and sending one or more instructions to force the updated tension setting, thereby adjusting a current tension setting of the magnetic tape.

6. A system, comprising:

a tape drive configured to perform the tape drive-implemented method of claim 1.

7. A computer program product comprising a computer readable storage medium having program instructions embodied therewith, wherein the computer readable storage medium is not a transitory signal per se, the program instructions readable and/or executable by a processor to cause the processor to perform a method comprising:

detecting, by the processor, a read error;

determining, by the processor, whether the read error is part of an error burst;

sending, by the processor, one or more instructions to perform a first re-read attempt on a portion of a magnetic tape corresponding to the read error in response to determining that the read error is not part of an error burst;

determining, by the processor, whether the first re-read attempt was performed successfully;

selecting, by the processor, a range of tension settings in response to determining that the first re-read attempt was not performed successfully;

selecting, by the processor, a range of lateral offsets;

sending, by the processor, one or more instructions to apply each unique combination of a tension setting from the range of tension settings and a lateral offset from the range of lateral offsets;

for each of the unique combinations applied, sending, by the processor, one or more instructions to perform a second phase re-read attempt on the portion of the magnetic tape corresponding to the read error; and determining, by the processor, whether the second phase re-read attempt was performed successfully for any of the unique combinations.

8. The computer program product as recited in claim 7, the program instructions readable and/or executable by the processor to cause the processor to perform the method comprising:

sending, by the processor, one or more instructions to revert a channel calibration to a nominal value in response to determining that the second phase re-read attempt was not performed successfully for any of the unique combinations;

sending, by the processor, one or more instructions to apply one or more setting changes;

sending, by the processor, one or more instructions to perform a third phase re-read attempt on the portion of the magnetic tape corresponding to the read error; and determining, by the processor, that a permanent error exists on the magnetic tape in response to determining that the third phase re-read attempt was not performed successfully.

9. The computer program product as recited in claim 8, wherein the one or more setting changes correspond to settings which are selected from a group of settings consisting of: dataflow, channel calibration, servo orientation, and magnetic tape speed.

10. The computer program product as recited in claim 8, the program instructions readable and/or executable by the processor to cause the processor to perform the method comprising:

prior to sending the one or more instructions to perform the third phase re-read attempt, sending, by the processor, one or more instructions to perform a rechuck of the magnetic tape.

11. The computer program product as recited in claim 7, the program instructions readable and/or executable by the processor to cause the processor to perform the method comprising:

using, by the processor, a table to determine an updated tension setting in response to determining that the read error is part of an error burst; and sending, by the processor, one or more instructions to force the updated tension setting, thereby adjusting a current tension setting of the magnetic tape.

12. A tape drive-implemented method, comprising:

detecting a read error;

determining whether the read error is part of an error burst;

sending one or more instructions to perform a first re-read attempt on a portion of a magnetic tape corresponding to the read error in response to determining that the error is not part of an error burst on the magnetic tape;

determining whether the first re-read attempt was performed successfully;

selecting a range of tension settings from a tension table in response to determining that the first re-read attempt was not performed successfully;

selecting a range of position error signal (PES) lateral offsets from PES table, wherein the PES table includes multiple ranges of PES lateral offset settings;

sending one or more instructions to apply each PES lateral offset in the selected range of PES lateral offsets with each tension setting in the selected range of tension settings;

sending one or more instructions to perform an additional re-read attempt for each unique combination of a PES lateral offset and a tension setting applied; and determining whether any of the additional re-read attempts were performed successfully.

13. The tape drive-implemented method as recited in claim 12, comprising:

examining performance data corresponding to portions of the read request which have been performed;

using at least a portion of the performance data to determine an updated tension setting in response to determining that the read error is part of an error burst; and sending one or more instructions to seed the updated tension setting, thereby adjusting a current tension setting of the magnetic tape.

14. The tape drive-implemented method as recited in claim 13 wherein the performance data is selected from a group consisting of: data channel performance, tension error criteria, data correction status information, error history information, persistent settings, and initial conditions.

15. The tape drive-implemented method as recited in claim 12, comprising:

determining whether a current tension setting of the magnetic tape is accurate; and sending one or more instructions to remove the current tension setting in response to determining that the current tension setting of the magnetic tape is not accurate.

16. The tape drive-implemented method as recited in claim 12, comprising:

using historical data and read correction data to determine whether to adjust a current tension setting of the magnetic tape in response to determining that the read error is part of an error burst, wherein using the historical data and the read correction data includes:

counting a number of channels that are unreadable, and assessing whether the unreadable channels have an overall channel degradation pattern which affects channels which are located closer to an edge of the magnetic tape more than channels which are located closer to a longitudinal axis of the magnetic tape.

17. The tape drive-implemented method as recited in claim 12, wherein the tension table includes multiple ranges of tension settings, wherein each range of tension settings includes a sequence of tension settings that incorporates a nominal tension setting.

18. The tape drive-implemented method as recited in claim 12, comprising:

sending one or more instructions to apply one or more calibration changes in response to determining that none of the additional re-read attempts were performed successfully;

sending one or more instructions to apply dataset reconstruction and iterative decode operations;

sending one or more instructions to perform a third phase re-read attempt;

determining whether the third phase re-read attempt was performed successfully; and concluding that a permanent error exists on the magnetic tape in response to determining that the third re-read attempt was not performed successfully.

19. The tape drive-implemented method as recited in claim 18, comprising:

prior to sending the one or more instructions to perform the third phase re-read attempt, sending one or more instructions to perform a rechuck of the magnetic tape.

20. The tape drive-implemented method as recited in claim 12, wherein the range of tension settings are selected based on a portion of the magnetic tape at which the read error occurred.

* * * * *